United States Patent
Oh et al.

(10) Patent No.: US 12,024,323 B2
(45) Date of Patent: Jul. 2, 2024

(54) CONTENT FILLING APPARATUS AND CONTENT FILLING METHOD USING SAME

(71) Applicant: INNERBOTTLE CO., LTD., Seongnam-si (KR)

(72) Inventors: Sea Il Oh, Suwon-si (KR); Yo Kyung Jang, Siheung-si (KR)

(73) Assignee: INNERBOTTLE CO., LTD., Seongnam-si (KR)

( * ) Notice: Subject to any disclaimer, the term of this patent is extended or adjusted under 35 U.S.C. 154(b) by 365 days.

(21) Appl. No.: 17/407,426

(22) Filed: Aug. 20, 2021

(65) Prior Publication Data

US 2021/0380286 A1    Dec. 9, 2021

Related U.S. Application Data

(63) Continuation of application No. PCT/KR2020/002503, filed on Feb. 21, 2020.

(30) Foreign Application Priority Data

Feb. 21, 2019   (KR) ........................ 10-2019-0020570
Apr. 25, 2019   (KR) ........................ 10-2019-0048536

(51) Int. Cl.
*B65B 3/04*      (2006.01)
*B65B 3/10*      (2006.01)
(Continued)

(52) U.S. Cl.
CPC ................ *B65B 3/045* (2013.01); *B65B 3/10* (2013.01); *B65B 3/18* (2013.01); *B65B 39/04* (2013.01); *B65B 39/12* (2013.01); *B65B 2220/18* (2013.01)

(58) Field of Classification Search
CPC .. B65B 3/045; B65B 3/10; B65B 3/18; B65B 37/00; B65B 37/06; B65B 39/04;
(Continued)

(56) References Cited

U.S. PATENT DOCUMENTS 4,238,264 A * 12/1980 Pelton et al. ........... B29C 49/24
                                                  264/269
2011/0187028 A1* 8/2011 Menning et al. .. B65D 83/0055
                                                  264/513
(Continued)

FOREIGN PATENT DOCUMENTS

CN         1876504 A      12/2006
CN       101987503 A       3/2011
(Continued)

OTHER PUBLICATIONS

Seung-hoon, Bang, International Search Report, dated Jul. 17, 2020, Korean Intellectual Property Office.

*Primary Examiner* — Stephen F. Gerrity
(74) *Attorney, Agent, or Firm* — Sisson & Banyas, Attorneys at Law, LLC

(57) ABSTRACT

The present disclosure relates to a content charging device for a container apparatus in which a liquid is stored, and a content charging method using the same. In the content charging device of the present disclosure, the container apparatus includes an external container in which a storage space is formed and which includes a container-side opening communicating with the storage space; and a pouch assembly installed on the external container. The container apparatus according to the present disclosure is configured to be able to store a viscous liquid, and has an effect of providing a device, a container, and a method of producing the same, capable of wholly using a content.

17 Claims, 36 Drawing Sheets

(51) Int. Cl.
  *B65B 3/18* (2006.01)
  *B65B 39/04* (2006.01)
  *B65B 39/12* (2006.01)

(58) Field of Classification Search
  CPC . B65B 39/12; B65B 2220/18; B65D 83/0055; B29C 49/12; B29C 2049/2404; B29C 2049/2442
  USPC ............... 53/452, 558, 175; 264/524, 532
  See application file for complete search history.

(56) References Cited

U.S. PATENT DOCUMENTS

| | | |
|---|---|---|
| 2011/0227258 A1 | 9/2011 | Patrini |
| 2012/0024419 A1 | 2/2012 | Behar |
| 2012/0266567 A1* | 10/2012 | Haesendonckx et al. ............... B65B 3/022 53/558 |
| 2013/0223768 A1* | 8/2013 | Futase .................. B65B 3/045 53/469 |

FOREIGN PATENT DOCUMENTS

| | | | | |
|---|---|---|---|---|
| JP | H0531791 A | * | 2/1993 | ......... B65D 83/0055 |
| JP | 3201417 B2 | * | 8/2001 | ........... B65D 1/0215 |
| JP | 2004203443 A | * | 7/2004 | ......... B05B 11/0013 |
| JP | 2008114859 A | * | 5/2008 | |
| JP | 2008184197 A | * | 8/2008 | |
| JP | 2013216336 A | | 10/2013 | |
| KR | 2020110002533 U | | 3/2011 | |
| KR | 10-1460080 B1 | | 11/2014 | |
| KR | 10-2018-0124430 | | 11/2018 | |
| KR | 10-1930811 B1 | | 12/2018 | |

* cited by examiner

[FIG. 1a]
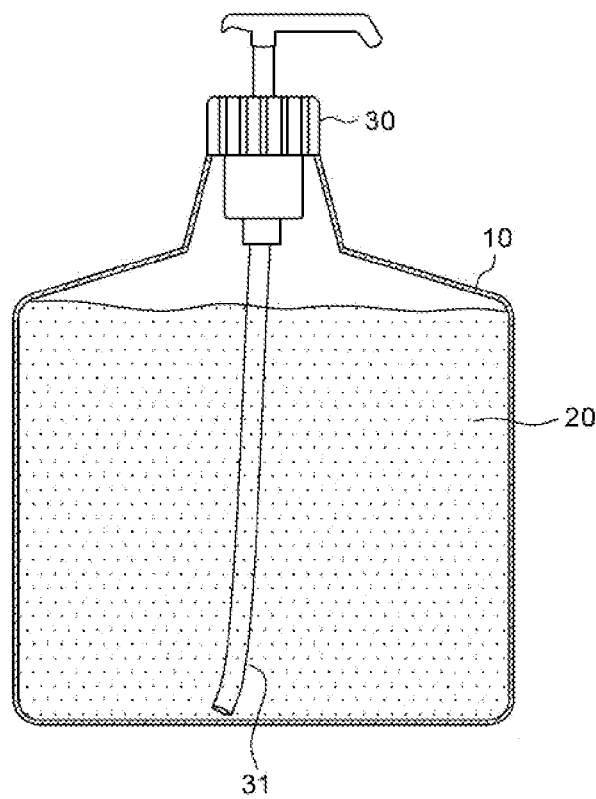
Prior Art

[FIG. 1b]
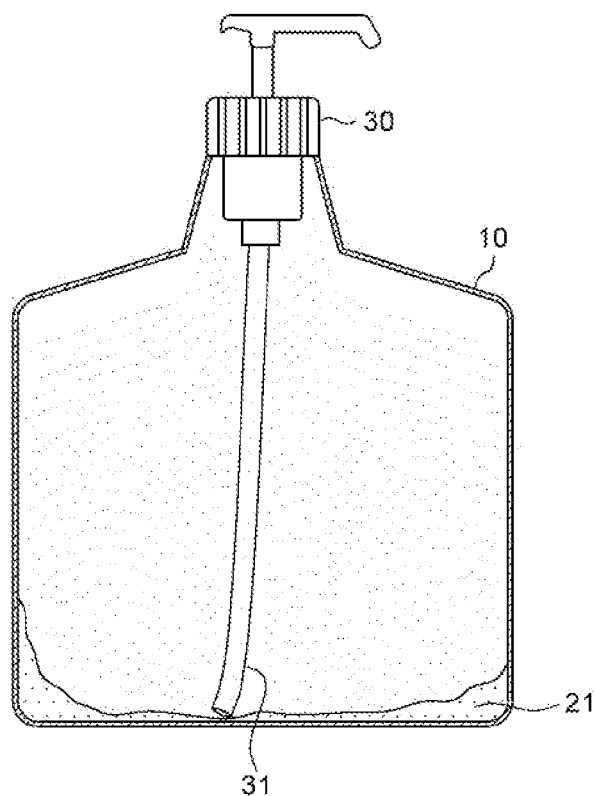
Prior Art

[FIG. 2a]
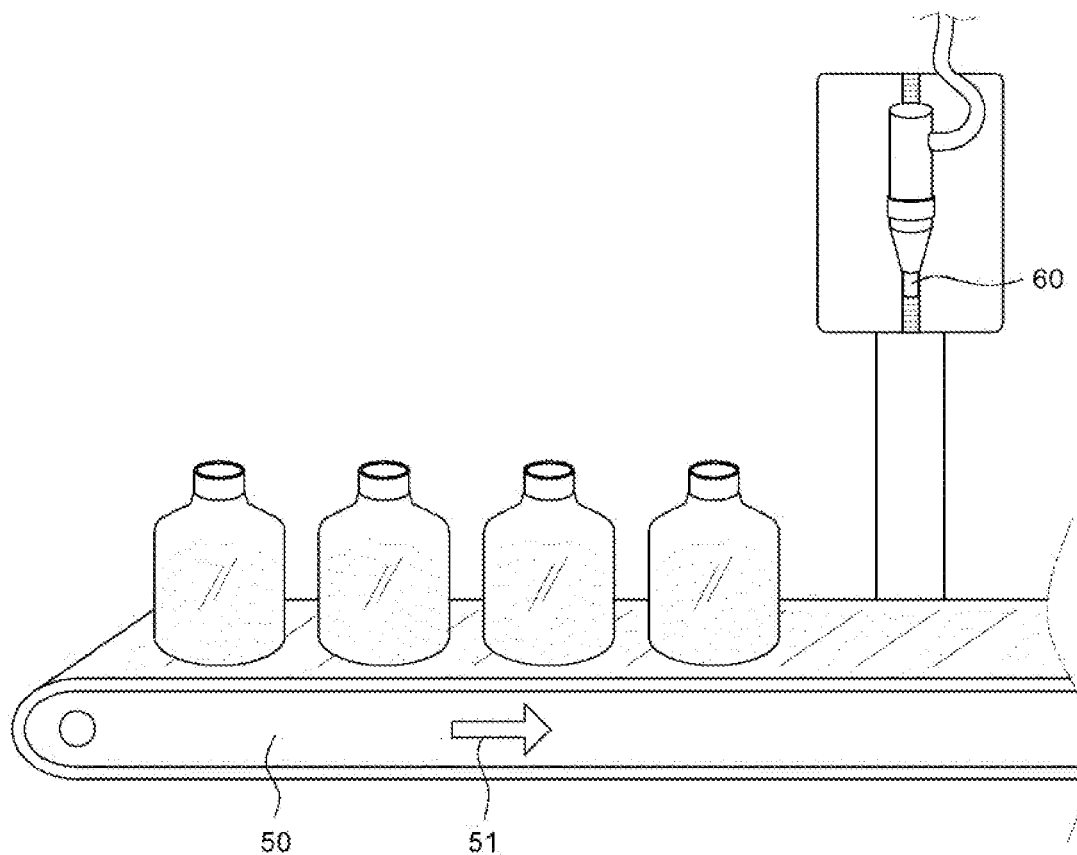
Prior Art

[FIG. 2b]
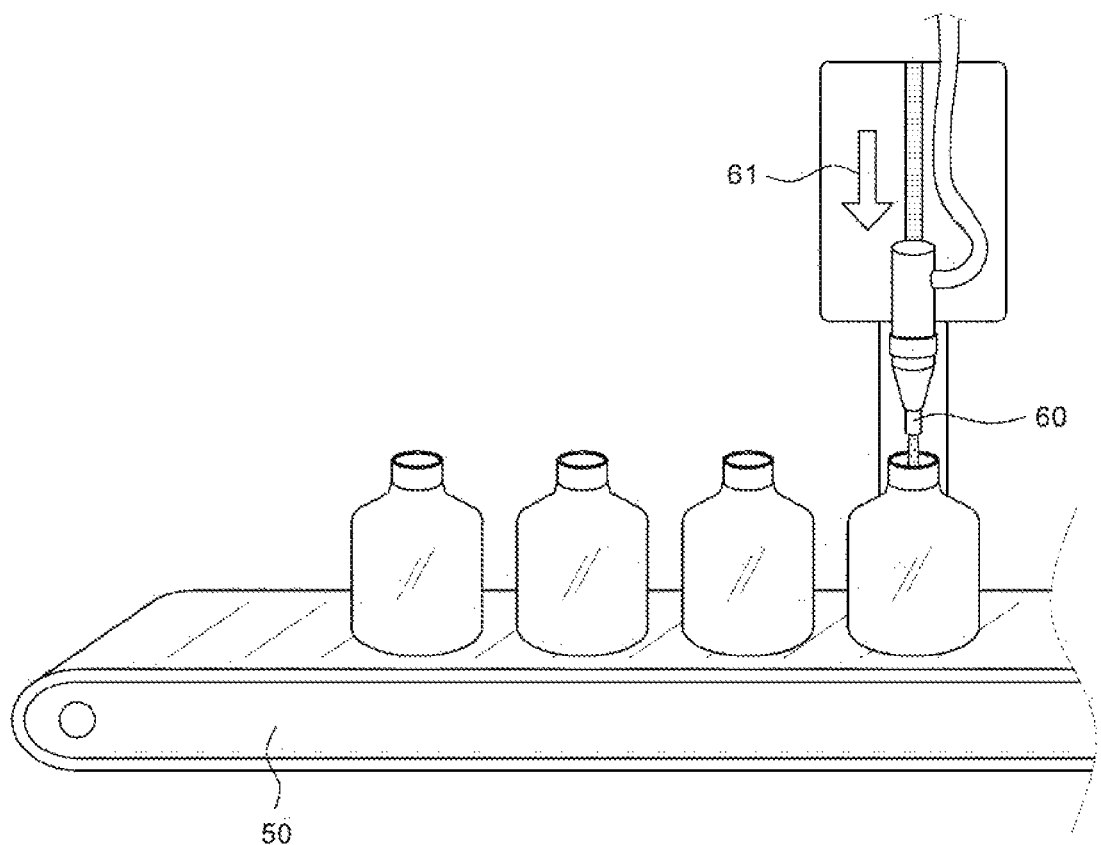
Prior Art

[FIG. 3]
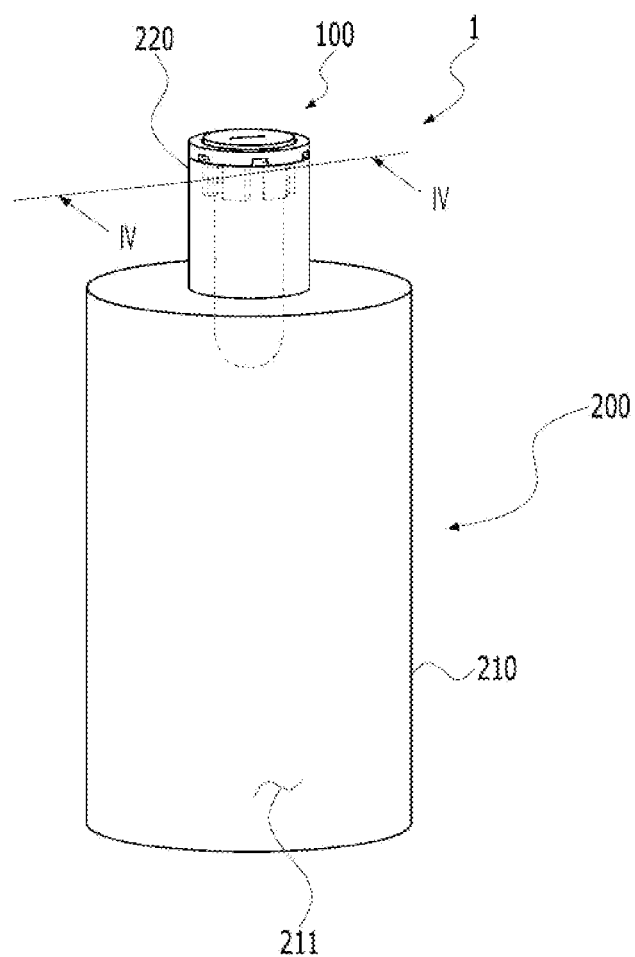

[FIG. 4]
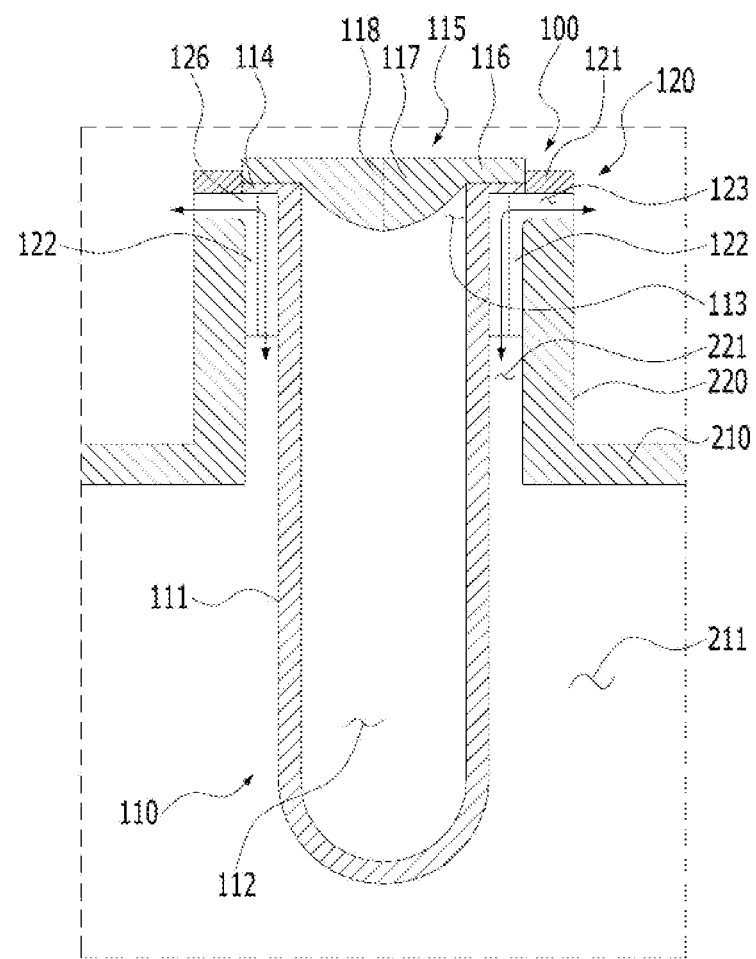

[FIG. 5]
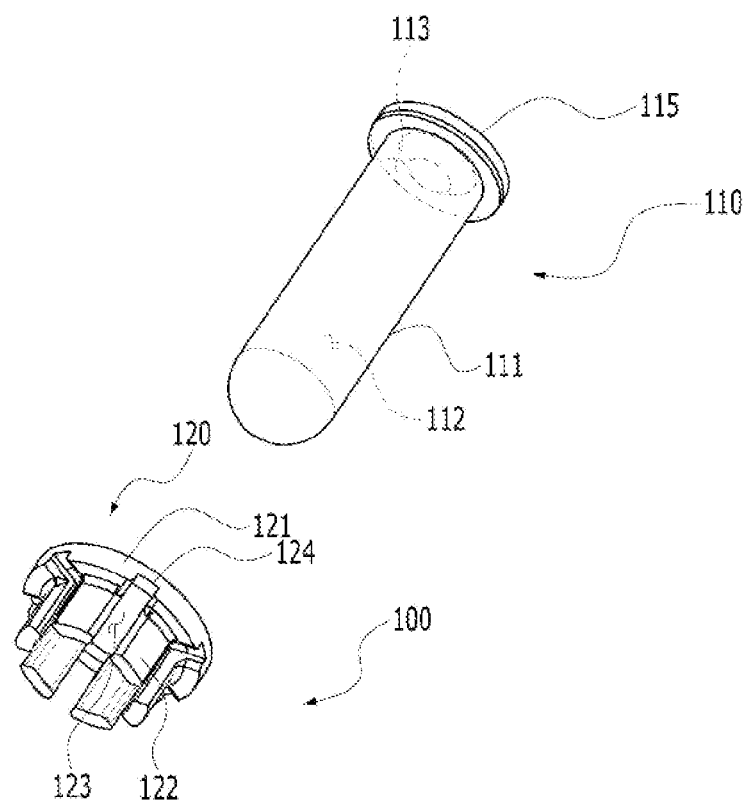

[FIG. 6]
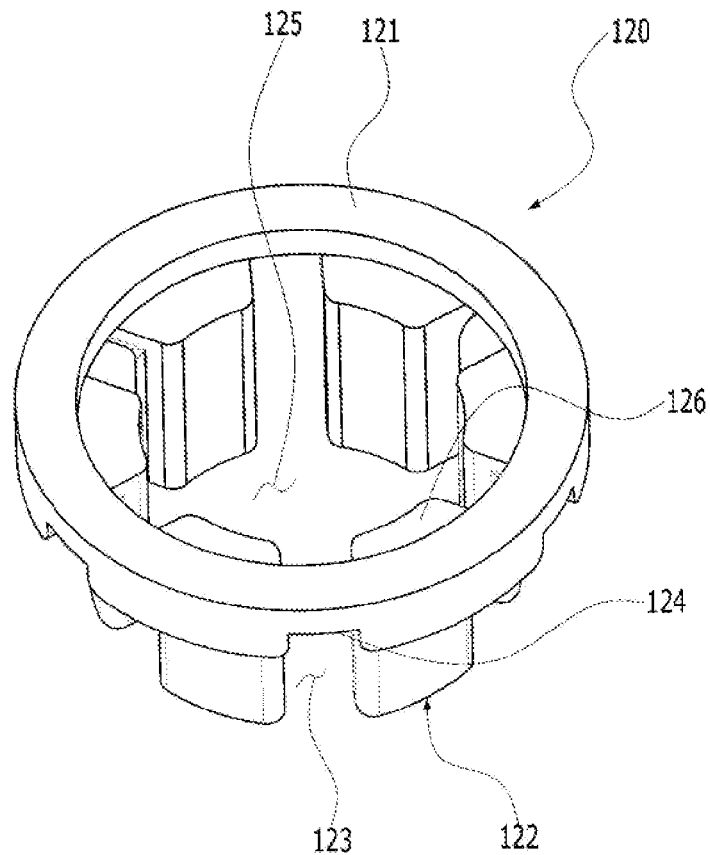
[FIG. 7]
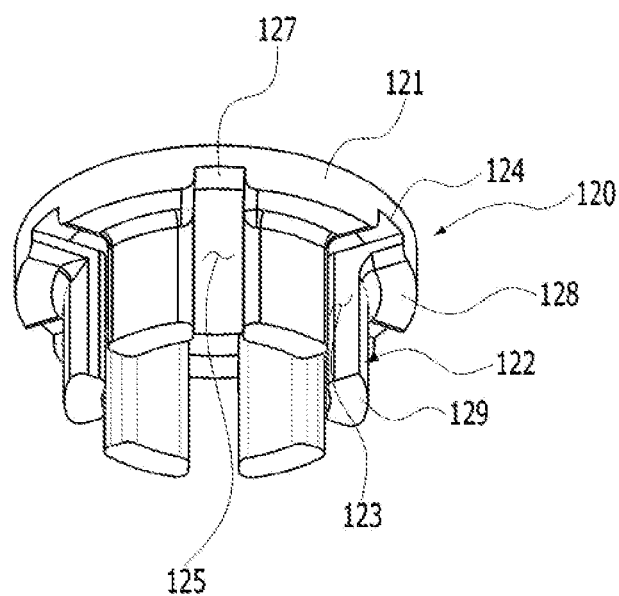

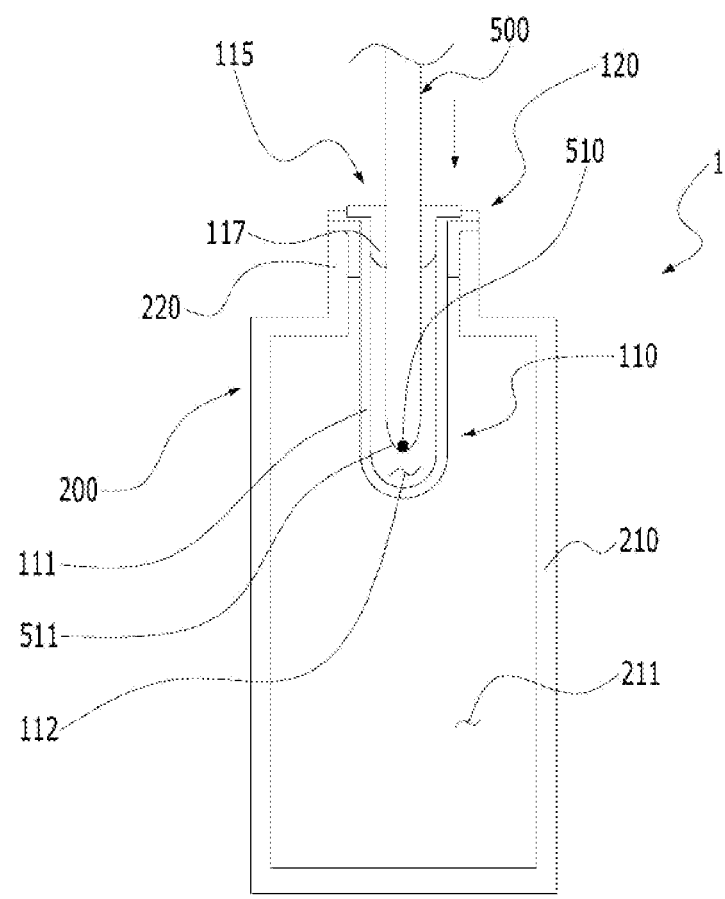
[FIG. 8]

[FIG. 9]
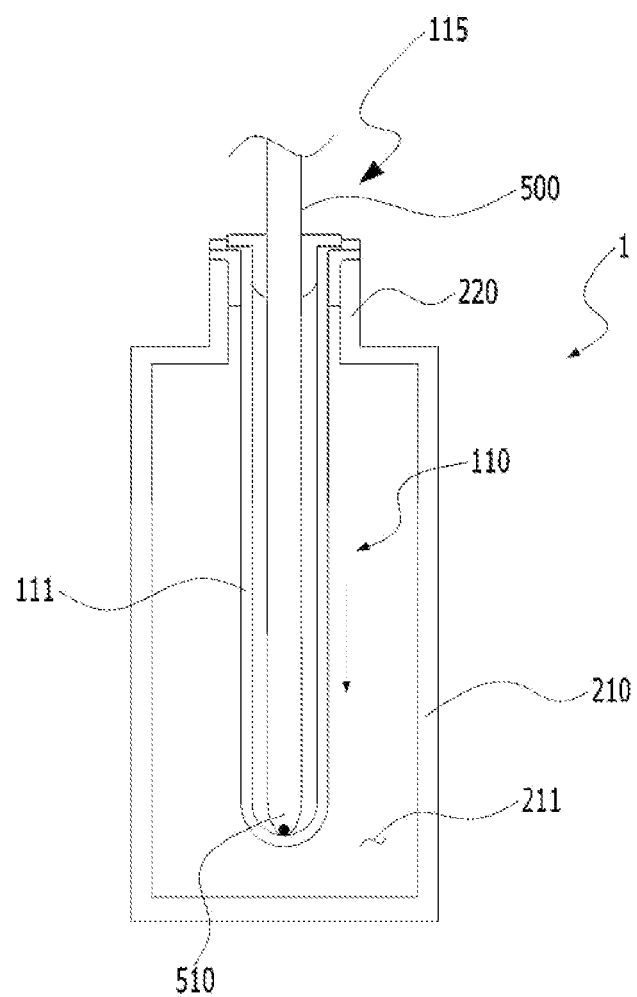

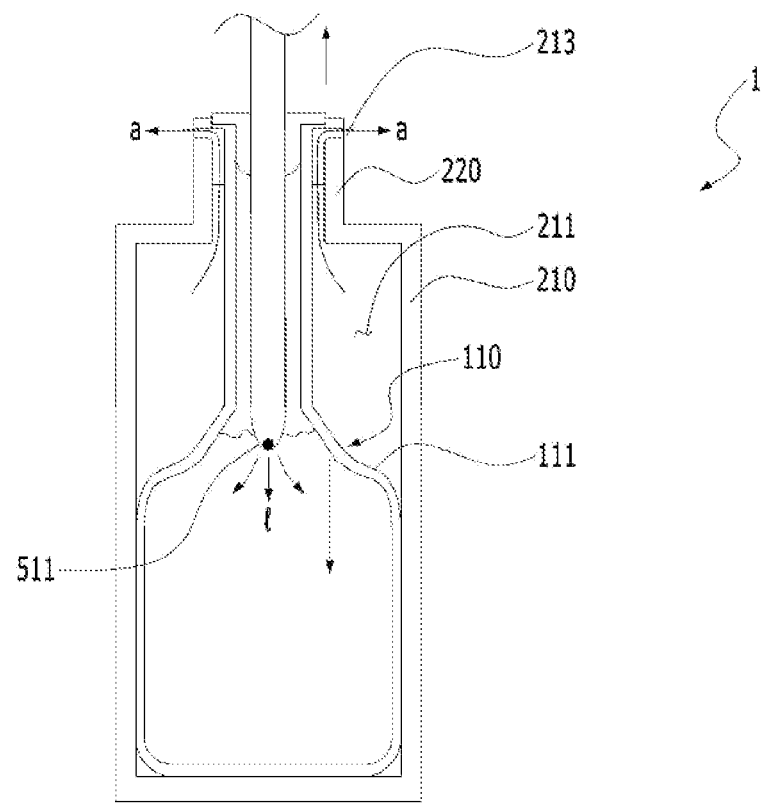
[FIG. 10]

[FIG. 11]
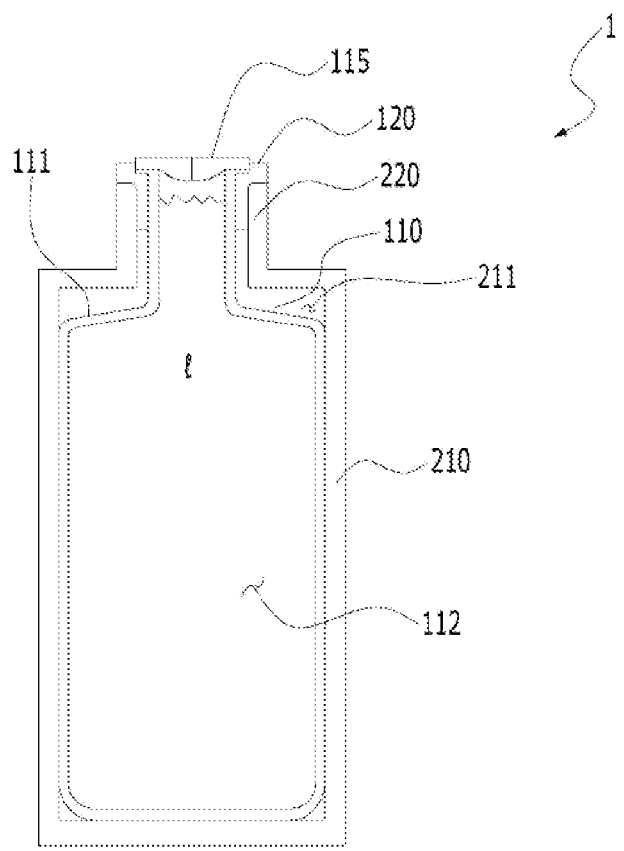

[FIG. 12]
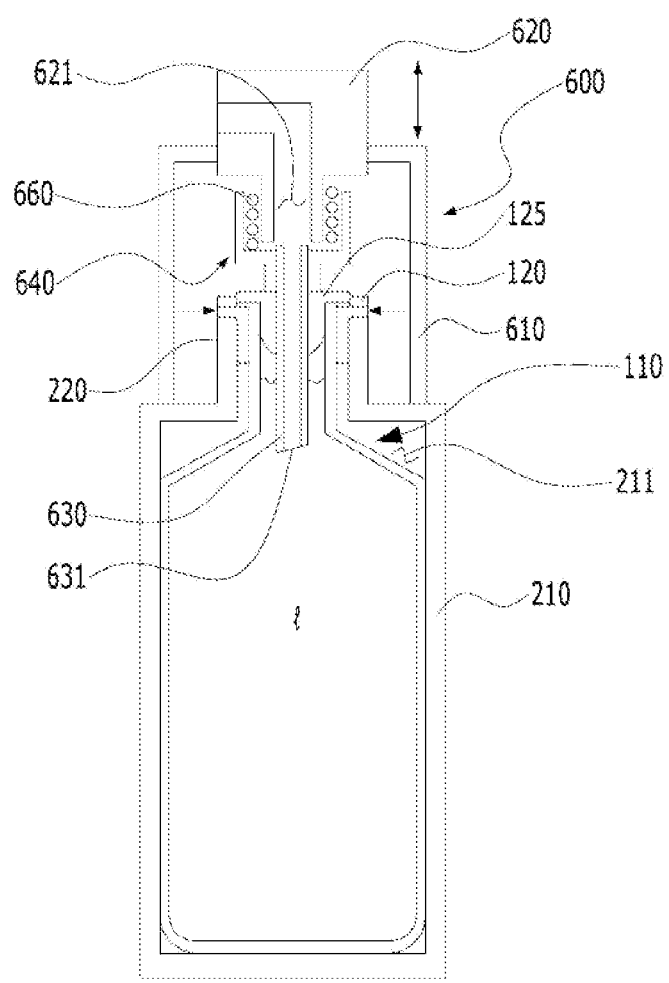

[FIG. 13]
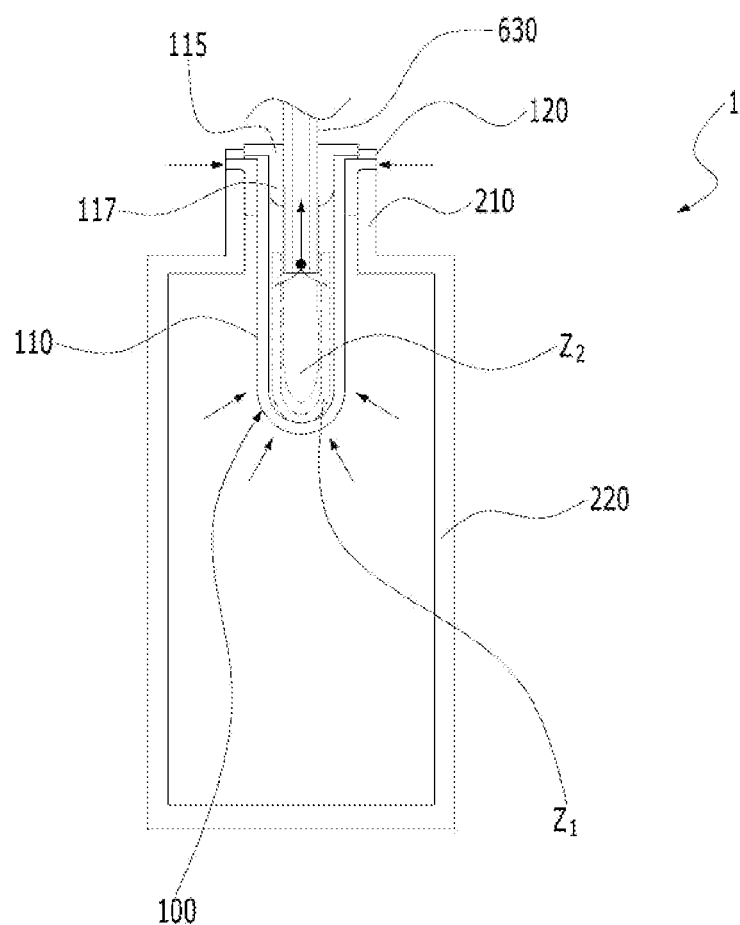

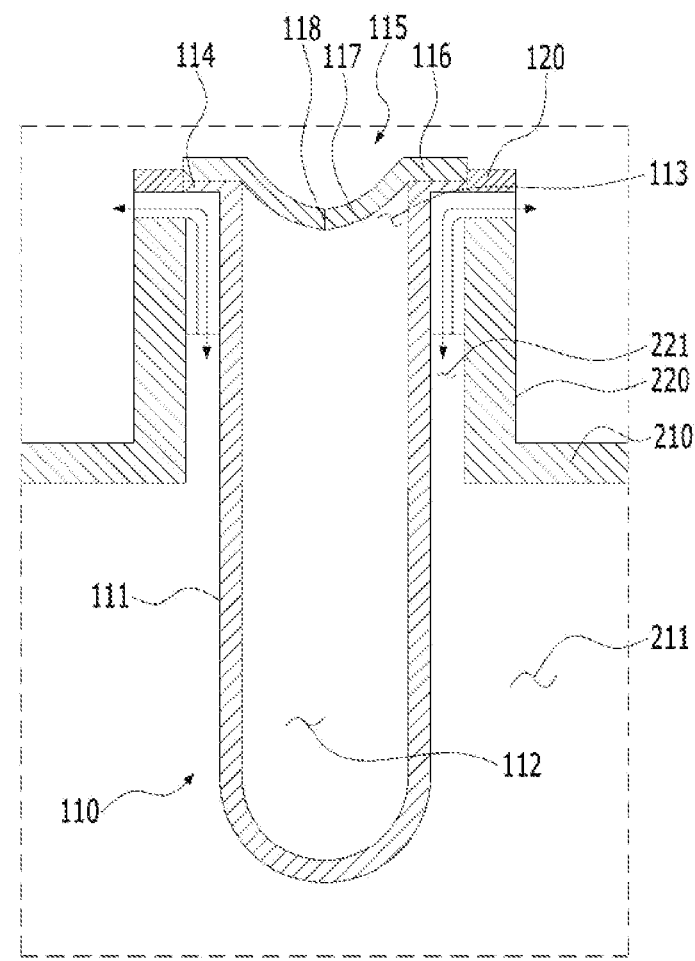
[FIG. 14]

[FIG. 15]
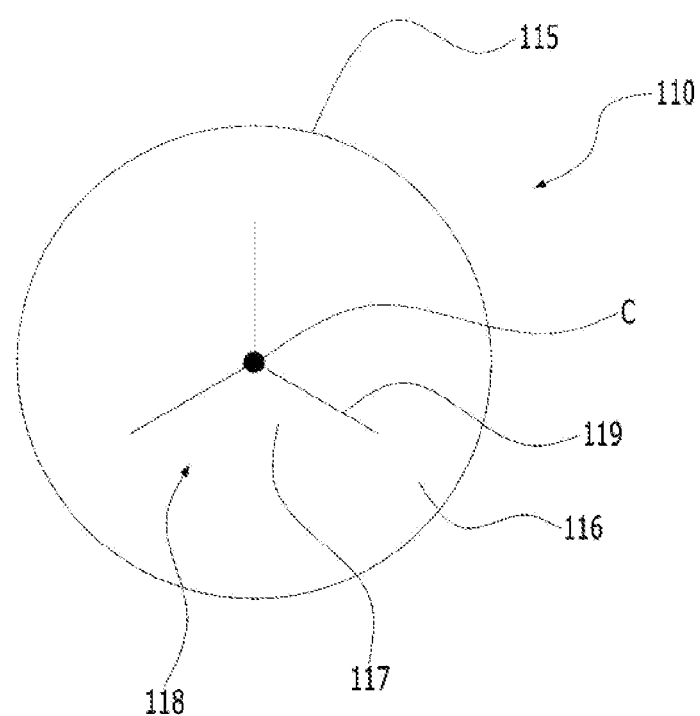

[FIG. 16]
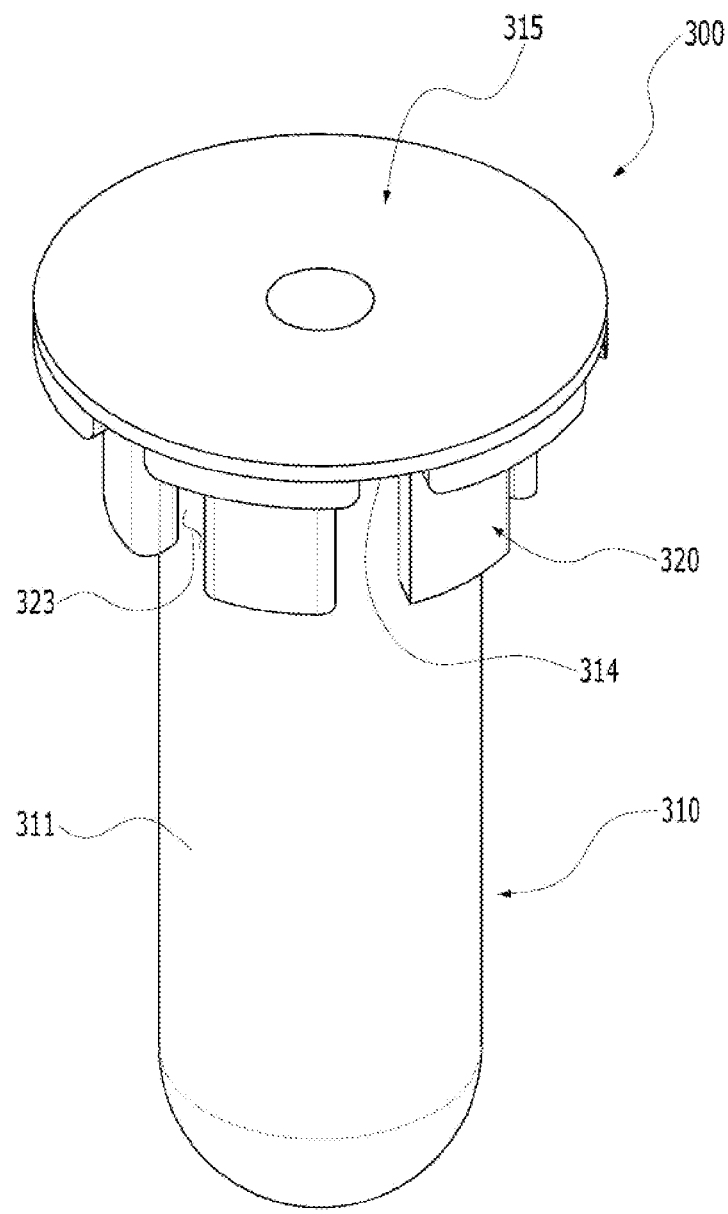

[FIG. 17]
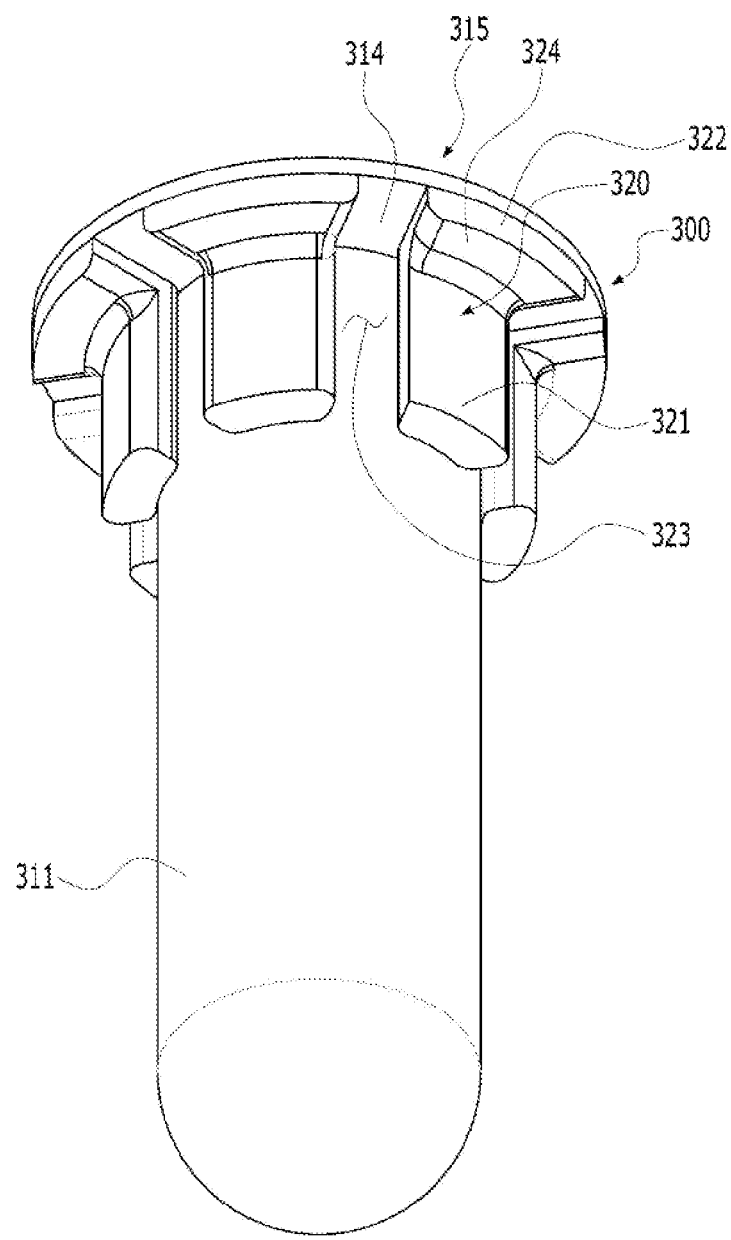

[FIG. 18]
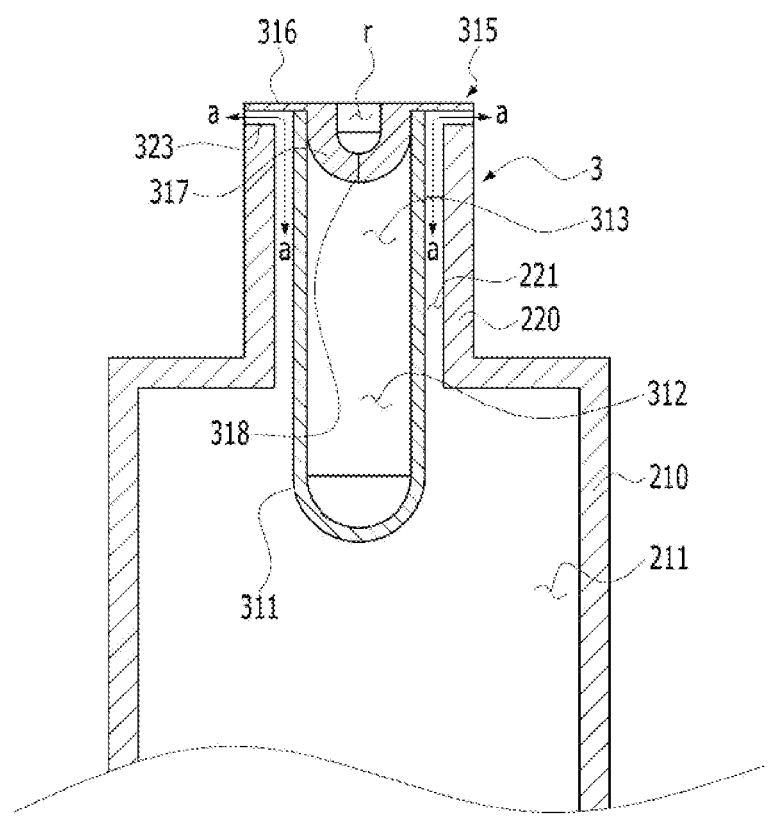

[FIG. 19]
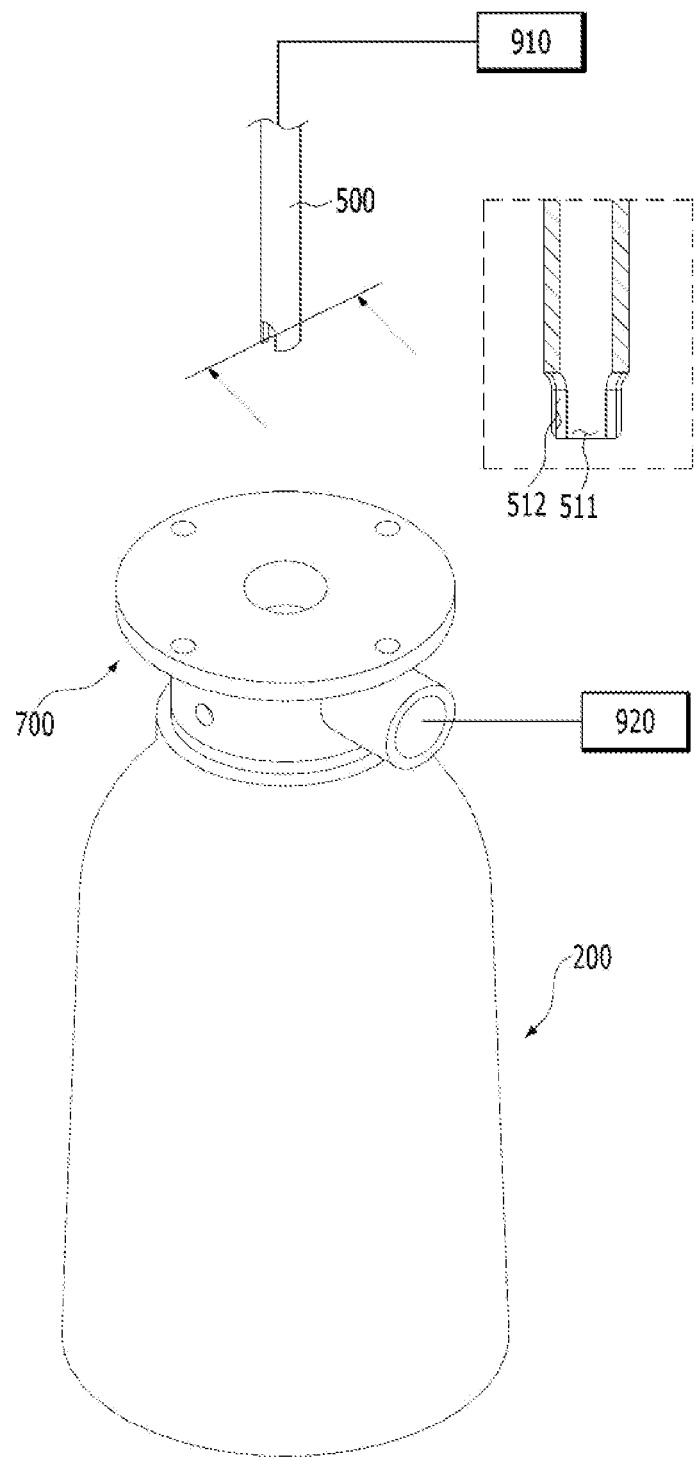

[FIG. 20]
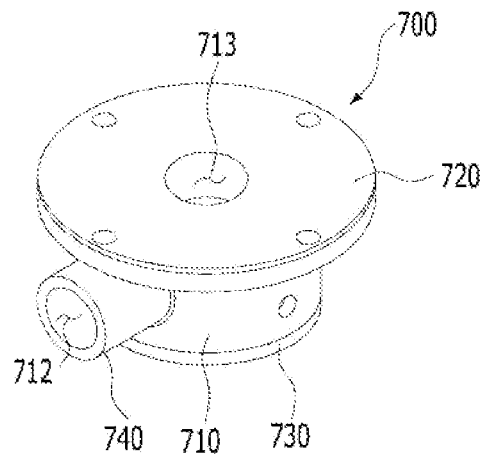
[FIG. 21]
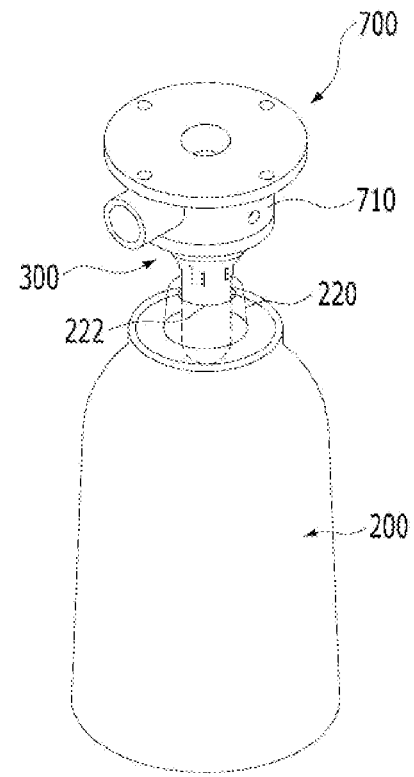

[FIG. 22]
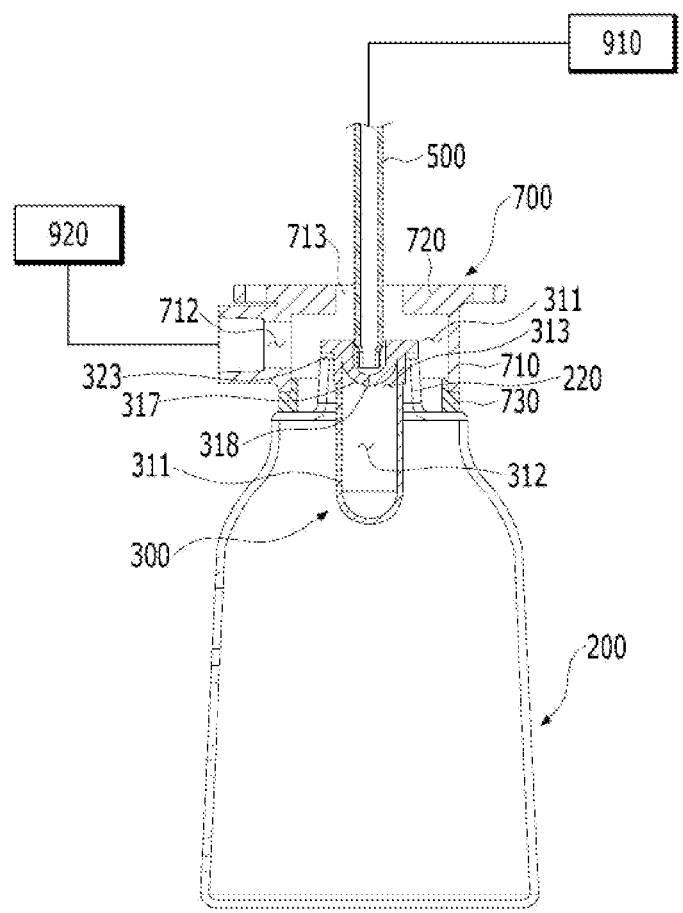

[FIG. 23]
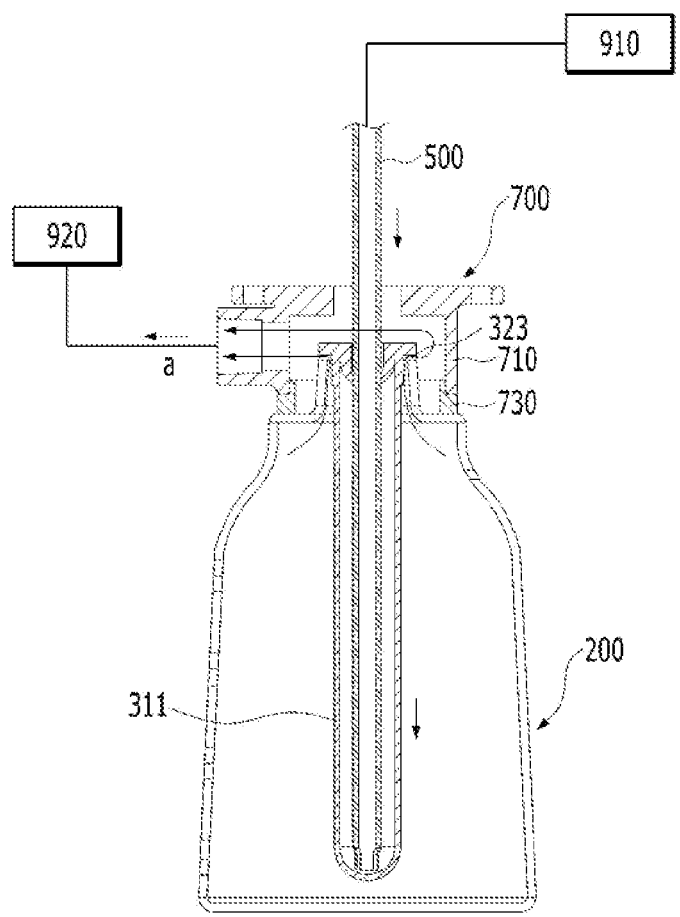

[FIG. 24]
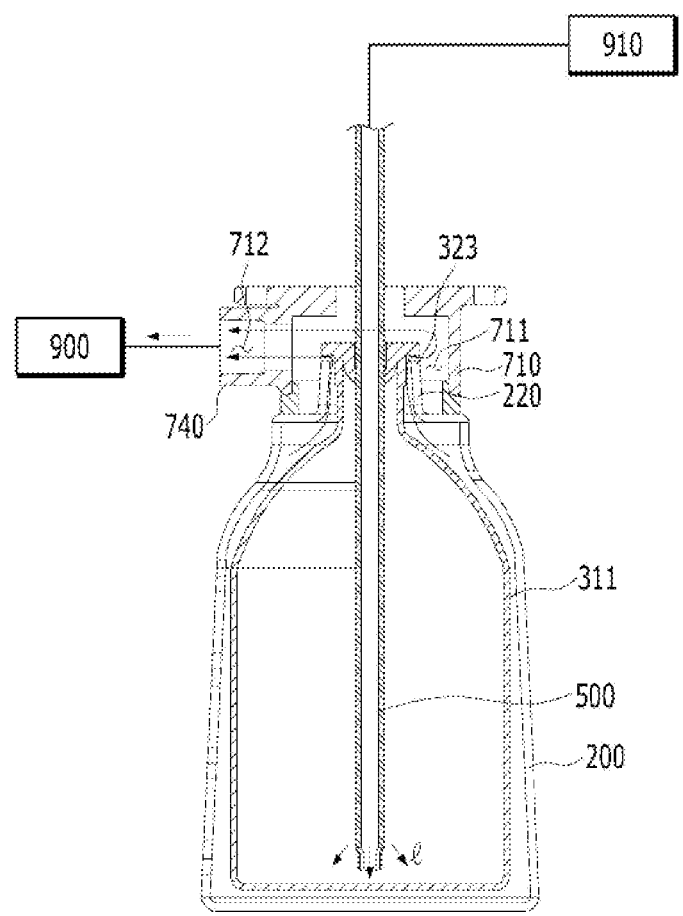

[FIG. 25]
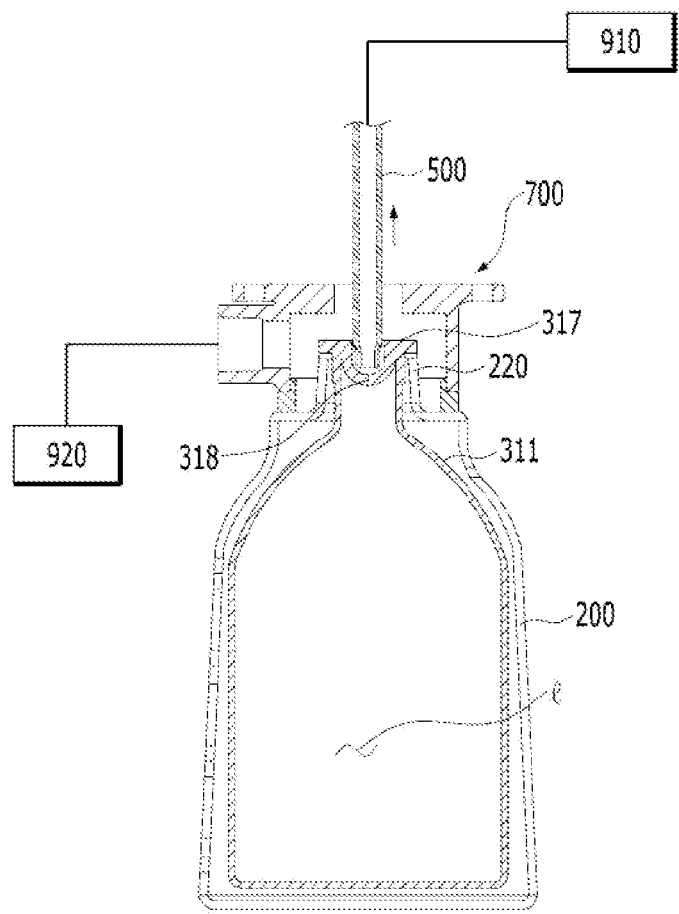

[FIG. 26]
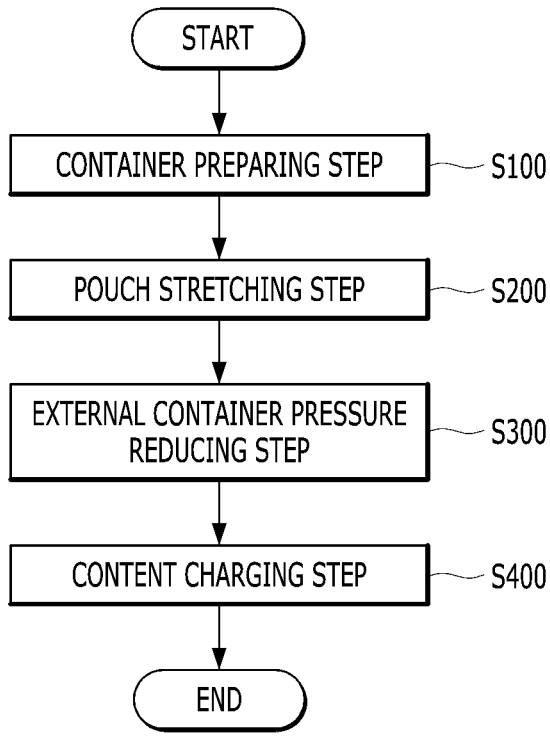
[FIG. 27]
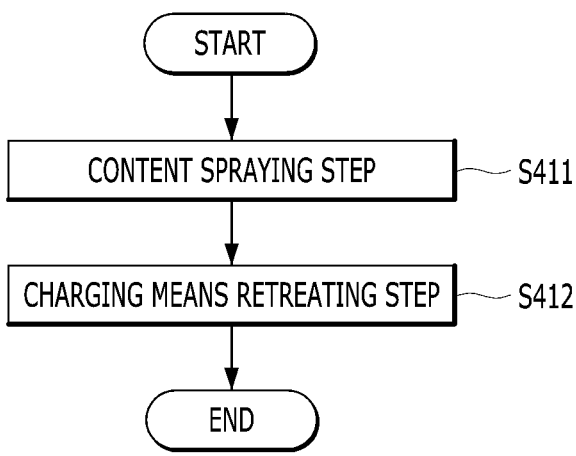

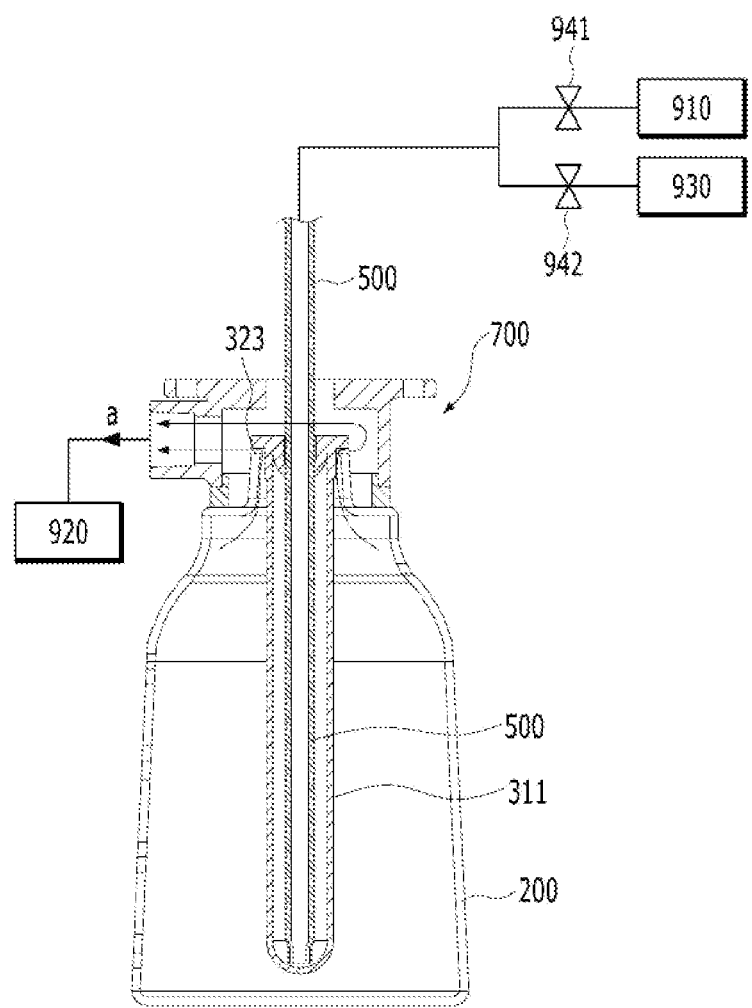
[FIG. 28]

[FIG. 29]
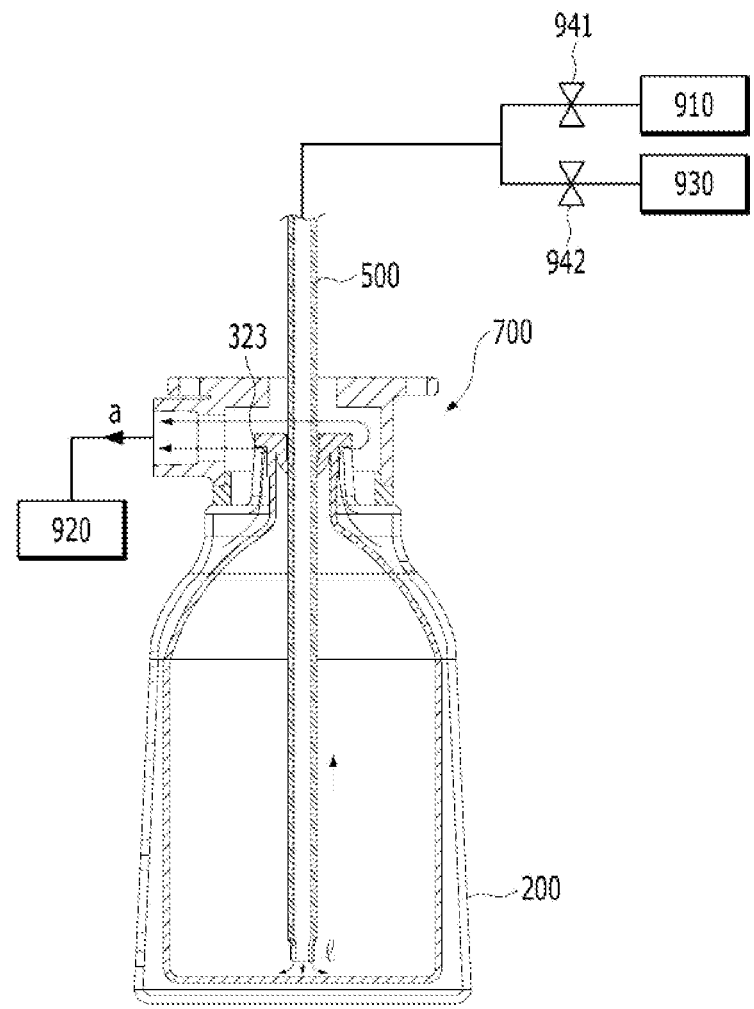
[FIG. 30]
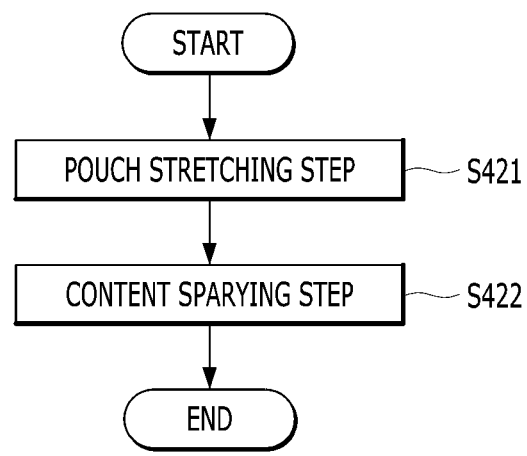

[FIG. 31]
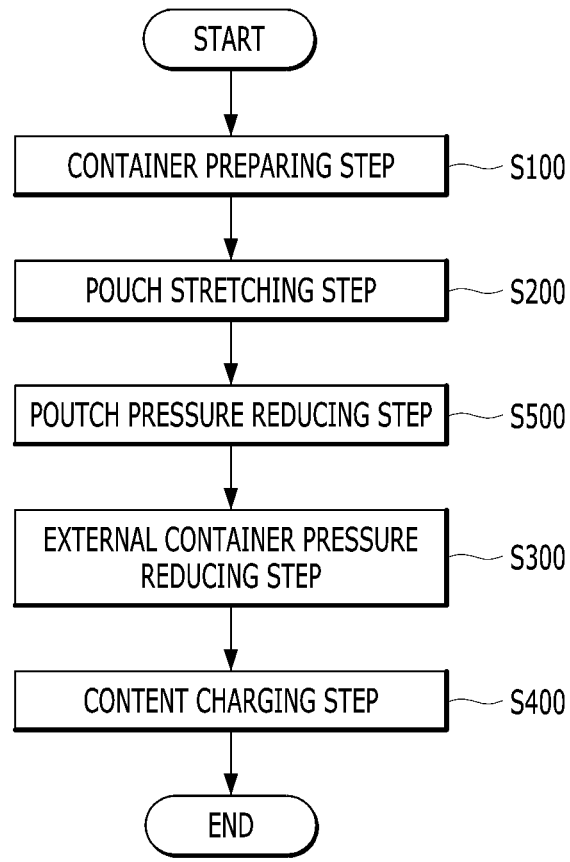
[FIG. 32]
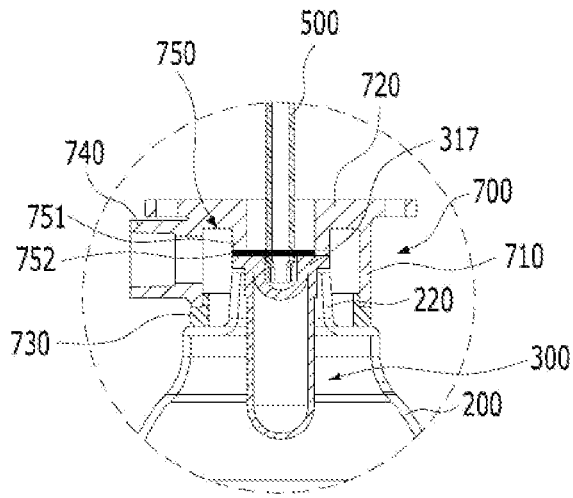

[FIG. 33]
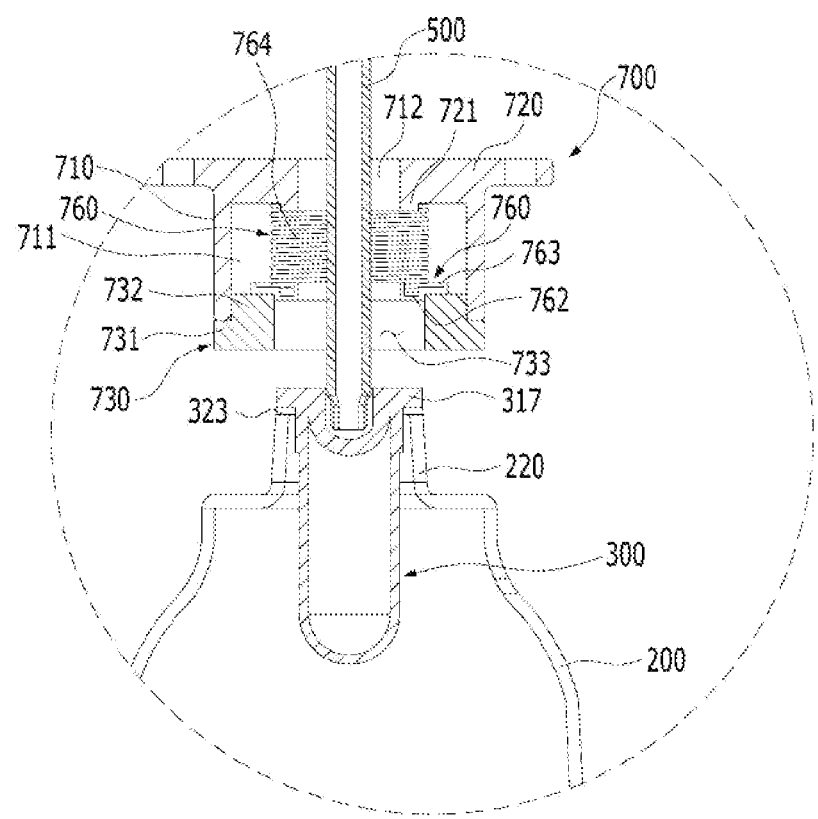

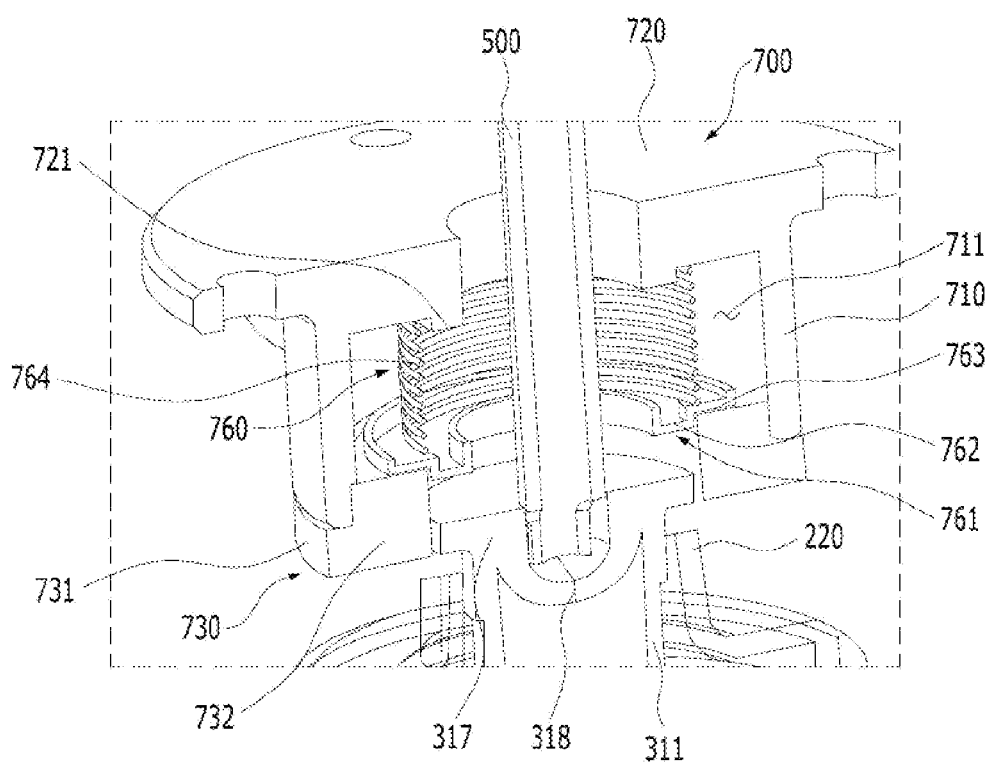
[FIG. 34]

[FIG. 35]
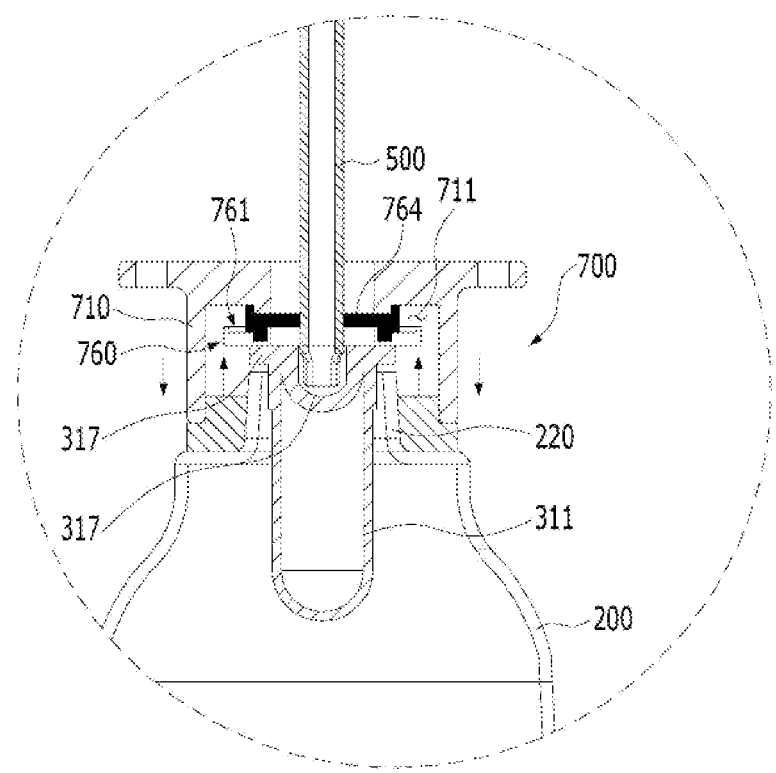

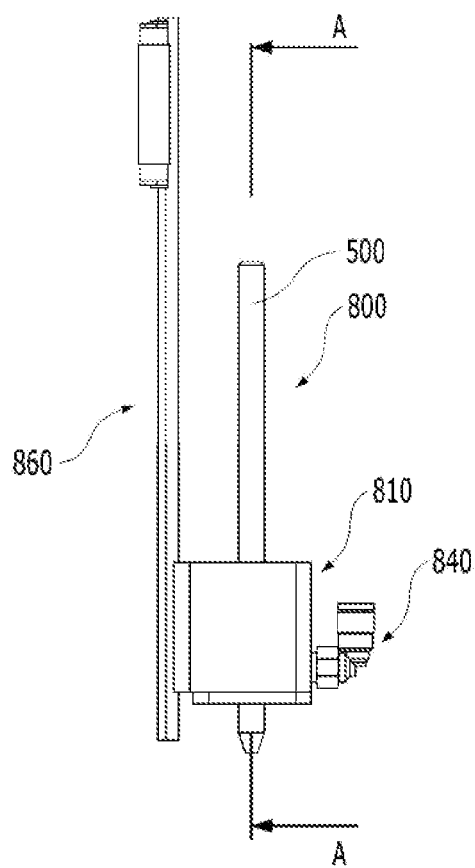
[FIG. 36]

[FIG. 37]
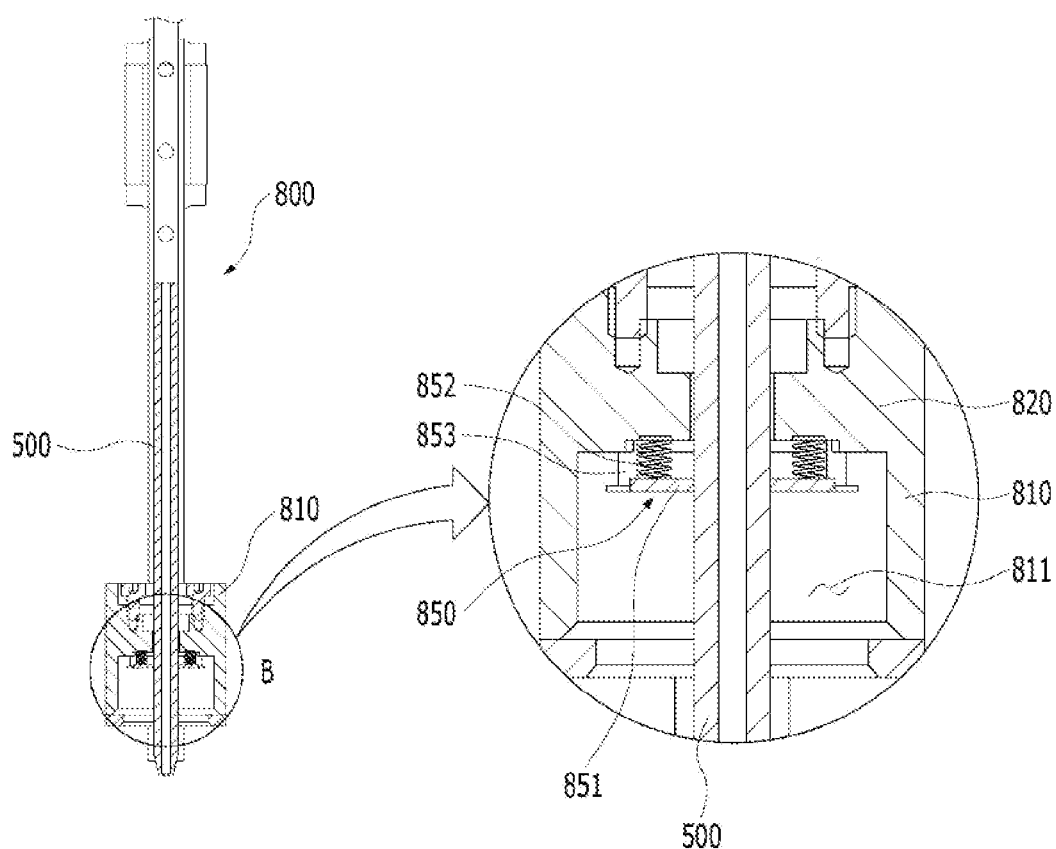

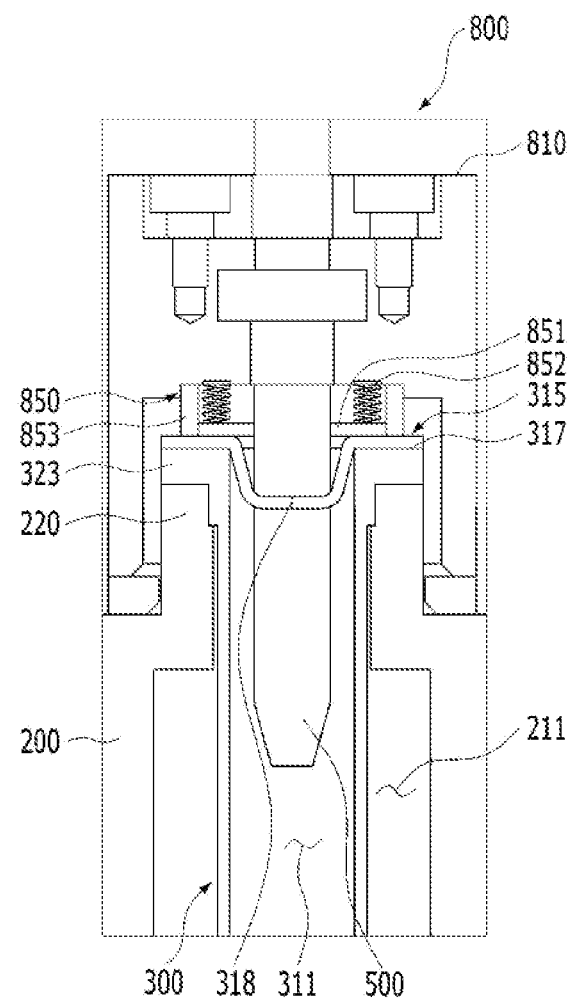
[FIG. 38]

[FIG. 39]
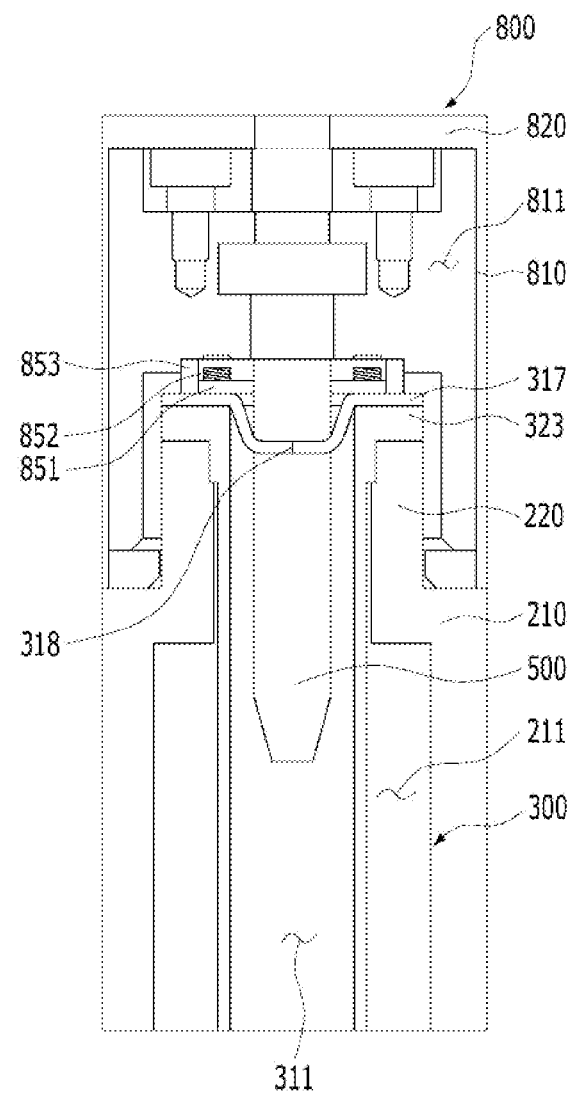

CONTENT FILLING APPARATUS AND CONTENT FILLING METHOD USING SAME

PRIORITIES AND CROSS REFERENCES

This application claims priority from International Application No. PCT/KR2020/002503 filed on 21 Feb. 2020 which claims priority Korean Application No. 10-2019-0048536 filed on 25 Apr. 2019 and Korean Application no. 10-2019-0020570 filed on 21 Feb. 2019, the teachings of each of which are incorporated by reference herein in their entirety.

TECHNICAL FIELD

The present disclosure relates to a content charging device for a container apparatus in which a liquid is stored, and a content charging method using the same.

BACKGROUND ART

FIG. 1A illustrates a storage container of a viscous liquid content according to the background art.

Liquids such as shampoos, lotions, or the like have a characteristic that they have relatively high viscosity. When this high-viscosity content 20 is stored in a container 10, the content tends to stick to an inner wall of the container due to the viscosity thereof. However, due to reasons of beauty, convenience of use, and so on, these goods are generally sold after being stored in the hard container 10 having a relatively small opening, as illustrated in FIG. 1A. That is, most of the contents are produced after stored in the hard container as illustrated in FIG. 1A due to sensibility of consumers, convenience of use, or the like. To discharge the content, a method of coupling a pump to a discharge unit 300 for the convenience of use and suctioning and discharging the content through a discharge pipe 310 due to a pump action based on a pneumatic pressure is generally used. However, there is no problem when the content 20 is sufficient in a storage space of the container 10 and can be discharged through the discharge pipe 310. However, when the content is a little left in the container 10, this causes a problem in that the remaining content sticks to the inner wall of the container and is not well separated, and the remaining content is hardly discharged. This serves as a great obstacle in cleanly using the contents such as shampoos, lotions, or the like.

FIG. 1B illustrates a state in a storage container when a little content remains in the storage container of a viscous liquid content according to the background art.

As illustrated in FIG. 1B, when a quantity of a remaining content 210 is little, the remaining content 210 sticks to the inner wall of the container 100 and is not well separated from the container 100, and a region in which a discharge pipe 310 coupled to a pump can be suctioned is restricted. Thus, there is a problem in that the remaining content 210 in the container is not effectively discharged. This problem causes the following serious problems because a lot of content sticking to the inner wall of the container is not satisfactorily discharged, which makes use difficult.

First, the content is left at a portion with which no hand comes into contact in the hard container and is discarded without sufficient use, thereby promoting overconsumption.

Second, when the container is discarded in a state in which the content such as a lotion, a shampoo, a detergent, or the like is left, environmental pollution can be caused.

Third, when a discharge port is opened by separating a discharge unit such as a pump from the container in order to use the content remaining in the container without being discharged by the discharge unit, the content may be contaminated due to, for instance, inflow of foreign materials.

Fourth, when an attempt is made to discharge the content remaining in the container by separating the discharge unit from the container and reversing and shaking the container, it is difficult to discharge an accurate quantity of content to be used.

Fifth, when the inside of an external container is stained with a remaining content, it is very difficult to recycle or reuse the container.

Meanwhile, to solve the above problems, an airless container in which a lower plate thereof is raised depending on use of a content and a volume of the content is reduced has been introduced. However, this container is unsuitable for a large capacity because the lower plate of the container is raised by a reduction in pressure of the content, and only a cylindrical container can be implemented, which imposes great restrictions on a degree of freedom of container design and increases costs for producing the container.

Therefore, a container and method that allow production at a low cost and can effectively inject and discharge a viscous content while maintaining beauty and convenience due to use of a hard container are required.

DISCLOSURE

Technical Problem

The inventors of the present disclosure have recognize a problem that, when a liquid, especially a high-viscosity liquid, is stored in a hard container having a narrow opening, the liquid content sticks to an inner wall of the hard container due to viscosity and surface tension of the liquid content, and when a little liquid content remains, it is not easily discharged using a pump or the like, which is unuseful. Nevertheless, the inventors have sufficiently recognized voices of related industrial fields in which the hard container is inevitably used for various reasons that the hard container makes a product look elegant in view of appearance, it is necessary to couple a pump or the like to a discharge unit for convenience of use, and so on.

Therefore, the inventors of the present disclosure have devised a container and apparatus in which a pouch having elasticity (an elastic pouch) is housed in a hard container and a liquid content is stored in the elastic pouch, whereby despite using the hard container, the content stored in the hard container can be used safely and perfectly through a new innovative method.

In this regard, as introduced above, the elastic pouch is provided in the hard container, and a process of charging a content in the elastic pouch in a process of producing a product should be accompanied to easily discharge the content even if a little content remains.

FIGS. 2A and 2B illustrate a process of charging liquids in hard containers in a common producing process for a shampoo, a lotion, and so on.

As illustrated in FIG. 2A, in the case of sold products in which liquids such as a shampoo or a lotion are stored in hard containers, the hard containers are disposed on a transfer apparatus 500 in a row and are transferred to a content charging facility 510. The content charging facility may have one or more nozzles 600 according to a design.

However, as illustrated in FIG. 2, because an elastic pouch should be extended for charging in advance, there is a problem that air in an external container should be removed in advance, and there is a problem that foreign materials may flow into the extended elastic pouch while the elastic pouch is charged with a content.

In addition, there is a problem that a hole should be drilled in the external container in order to remove air in the external container, and there is a problem that, after the elastic pouch is extended, the elastic pouch should be sealed for preventing outflow of air or should maintain a reduced pressure in order to maintain the extended state of the elastic pouch for charging.

Therefore, a problem to be solved by the present disclosure is to provide an apparatus, a container, and a method of producing the same, capable of wholly using a content by enabling a viscous liquid to be stored in a container apparatus that can store and discharge a liquid according to the present disclosure.

Another problem to be solved by the present disclosure is to provide an apparatus, a container, and a method of producing the same, in which an elastic pouch that can be inserted into a hard container is provided, a remaining content can be effectively used by a pressure under which the elastic pouch pushes a content toward an opening by a surface area reducing effect caused by shrinkage of the elastic pouch and elasticity (a restoring force) of the elastic pouch, and a discharge pressure of a discharge apparatus, and when the elastic pouch is expanded by the elasticity thereof, the hard container can be deformed in various shapes, and thereby the hard container can be designed regardless of a shape of the hard container.

Yet another problem to be solved by the present disclosure is to provide an apparatus, container, and method of producing the same, capable of hygienically and efficiently charging a content in an elastic pouch while satisfying a condition in which the elastic pouch should be expanded as large as a size of an external container in order to inject the content.

The problems of the present disclosure are not limited to the above-mentioned problems, and other problems not mentioned can be clearly understood by those skilled in the art from the following description.

Technical Solution

According to an aspect of an embodiment of the present disclosure, a content charging device for a container apparatus that includes: an external container in which a storage space is formed and which includes a container-side opening communicating with the storage space; and a pouch assembly installed on the external container and including a pouch unit which is formed of an elastic material and has a charging space formed to be charged with a liquid, wherein the pouch unit is partly inserted into the storage space through the container-side opening, the content charging device includes a charging means that is inserted into the charging space of the pouch unit, has flow holes which are formed on one side thereof and through which air or a content is caused to flow, and is slidable toward an end of the pouch unit from a pouch-side opening of the pouch unit.

Moreover, fluid channels, which are formed between a part of an inner wall of an opening of the external container and a part of the pouch assembly and provide communication between an internal space of the external container and an outside of the external container, may be formed in the container apparatus, and the content charging device may further include a suction means having a suction means body which surrounds one end of each fluid channel, an inner surface of which is spaced apart from the one end of each fluid channel, and which has a suction space formed between the inner surface and the container apparatus. A suction hole communicating with the suction space may be formed in the suction means body.

Moreover, the suction means may further include an elastic member that is disposed between the suction means body and an outer surface of the external container and comes into close contact with the outer surface of the external container.

Moreover, a charging means insertion hole into which the charging means is slidably inserted may be formed in an upper surface of the suction means body, and the charging means insertion hole may be aligned next to the pouch-side opening of the pouch unit.

Moreover, the suction means may further include a pouch unit edge pressing unit that presses an upper edge of the pouch unit seated on an end of the external container toward the end of the external container.

Moreover, the pouch unit edge pressing unit may include a pressing bracket that is formed to protrude from an inner surface of the suction means body toward the suction space and is formed in an annular shape, and an elastic pressing part that is disposed on a lower side of the pressing bracket, is formed in an annular shape corresponding to the pressing bracket, and has a lower surface coming into contact with an upper surface of the upper edge of the pouch unit.

Moreover, the pouch unit edge pressing unit may include a pressing bracket that is disposed in the suction space of the suction means body so as to be movable in a vertical direction and includes a pressing region that brings the upper edge of the pouch unit into close contact with the end of the external container, and an elastic unit that provides an elastic force to the pressing bracket in a vertical direction.

Moreover, one side of the elastic unit may come into contact with an inner surface of the suction means body, and the other side of the elastic unit may come into contact with the pressing region of the pressing bracket.

Moreover, an elastic unit fixing bracket on which the one side of the elastic unit is installed may be formed on an inner surface of the suction means body. An elastic member, which is disposed between the suction means body and an outer surface of the external container and comes into contact with the outer surface of the external container, may be provided on a lower side of the suction means body. The elastic member may include a first region that comes into contact with an end of the suction means body, and a second region that extends toward the center of the suction means on the basis of the first region and has an elastic member-side through-hole which is formed in the center thereof and in which a part of the external container is located. The pressing bracket may further include a supporting region that is formed outside the pressing region so as to surround the pressing region and is placed on an upper surface of the second region. An outer diameter of the pressing region may be formed in a size corresponding to a diameter of the elastic member-side through-hole, and a step may be formed between the pressing region and the supporting region.

Moreover, the pouch unit edge pressing unit may further include a pair of guide brackets which are formed to extend in the same direction as a moving direction of the pressing bracket, into which a part of the pressing bracket is fitted, and which are fixed to an inner surface of the suction means body on one side thereof.

Moreover, the pressing region of the pressing bracket may be formed in a circular shape. A charging means insertion hole, into which the charging means is slidably inserted, may be formed in the center of the pressing bracket. One surface of the pressing region coming into contact with one surface of an edge of the pouch unit may be formed in a planar shape.

Moreover, the pouch assembly of the container apparatus may further include a plurality of guides that come into contact with a pouch unit body of the pouch unit and an inner surface of the external container, and the fluid channels may be formed between any one of the guides and another guide.

Moreover, the charging means may be formed long in a vertical direction, and the flow holes may be formed in an end of the charging means inserted into the charging space, and the flow holes may include a central flow hole disposed in the center of the end of the charging means and lateral flow holes that are disposed at positions beyond the center of the end and are connected to the central flow hole.

Moreover, the content charging device may further include: a content supplying means configured to supply the content; and a sucking/exhausting means configured to suck or exhaust air. The charging means may be connected to the content supplying means and the sucking/exhausting means, and the content or air may selectively flow through the flow holes.

Moreover, the pouch assembly of the container apparatus may further include a selective sealing unit that is installed in the pouch-side opening and selectively opens/closes the pouch-side opening. The sealing unit may be formed of an elastic material and be openable/closable on the basis of a slit formed in the sealing unit. The charging means may press and open the slit of the sealing unit body and be then partly inserted into the charging space of the pouch unit.

A content charging method using a content charging device according to another aspect of an embodiment of the present disclosure, in the content charging device for a container apparatus which includes: an external container in which a storage space is formed and which includes a container-side opening communicating with the storage space; and a pouch assembly installed on the external container and including a pouch unit which is formed of an elastic material and has a charging space formed to be charged with a liquid, the pouch unit being partly inserted into the storage space through the container-side opening, the content charging device including a charging means that is inserted into the charging space of the pouch unit, has flow holes which are formed on one side thereof and through which air or a content is caused to flow, and is slidable toward an end of the pouch unit from a pouch-side opening of the pouch unit, the content charging method includes: a container preparing step of preparing an external container and a container having a pouch assembly coupled to the external container such that a charging space of the pouch assembly is located in a storage space of the external container; a pouch stretching step of inserting a part of a charging means into the charging space through a pouch-side opening of the pouch assembly at one side of the external container, then moving the charging means toward the other side of the external container, and extending a pouch unit of the pouch assembly; and a content charging step of charging the charging space of the pouch assembly with a content.

Moreover, fluid channels, which are formed between a part of an inner wall of an opening of the external container and a part of the pouch assembly and provide communication between an internal space of the external container and an outside of the external container, may be formed in the container apparatus, and the content charging device may further include a suction means having a suction means body which surrounds one end of each fluid channel, an inner surface of which is spaced apart from the one end of each fluid channel, and which has a suction space formed between the inner surface and the container apparatus, wherein a suction hole communicating with the suction space is formed in the suction means body. The content charging method may further include an external container pressure reducing step of discharging air of the storage space of the external container, which communicates with the suction hole, the suction space, and the fluid channels, through the suction hole of the suction means to an outside in a state in which the suction means is installed on the container apparatus after the pouch stretching step is performed.

Moreover, the content charging method may further include a pouch pressure reducing step of reducing a pressure of the charging space of the pouch unit through the flow holes formed at the end of the charging means after the pouch stretching step is performed.

Moreover, the pouch pressure reducing step may be performed prior to the external container pressure reducing step.

Moreover, the sealing unit body may be formed of an elastic material, and may be operable/closable on the basis of a slit formed in the sealing unit body, and in the pouch stretching step, the charging means may press and open the slit of the sealing unit body and be then partly inserted into the charging space of the pouch unit.

Moreover, the content charging step may include a content spraying step of supplying a content to the charging space through the flow holes in a state in which the pouch unit is extended, and a charging means retreating step of separating the charging means from the charging space of the pouch unit after the charging space of the pouch unit is charged with the content by a preset volume. In the content spraying step, the charging space of the pouch unit may be expanded in a left-right direction intersecting a direction in which the pouch unit is extended in the pouch stretching step.

Moreover, the content charging method may further include: a pouch stretching step of supplying air to the charging space through the flow holes in a state in which the pouch unit is extended and expanding the pouch as much as a preset volume; and a content spraying step of supplying the content to the charging space through the flow holes after the pouch unit is extended by a preset volume. The content charging device may further include a content supplying means for supplying the content and a sucking/exhausting means for sucking or exhausting air, the charging means may be connected to the content supplying means and the sucking/exhausting means, and the content or air may selectively flow through the flow holes. A flow between the flow holes and the sucking/exhausting means may be activated in the pouch stretching step, and a flow between the flow holes and the content supplying means may be activated in the content charging step, and in the content spraying step, the charging means may be moved in a direction separated from the charging space at a preset speed while the content is supplied to the charging space.

Advantageous Effects

The present disclosure is to solve the above problems, and the container apparatus according to the present disclosure is configured to be able to store a viscous liquid, and has an effect of providing a device, a container, and a method of producing the same, capable of wholly using a content.

A device, a container, and a method of producing the same according to an embodiment of the present disclosure provide an elastic pouch that can be inserted into a hard container, in which a remaining content can be effectively used by a pressure under which the elastic pouch pushes a content toward an opening by a surface area reducing effect caused by shrinkage of the elastic pouch and elasticity (a restoring force) of the elastic pouch, and a discharge pressure of a discharge apparatus, and when the elastic pouch is expanded by the elasticity thereof, the hard container can be deformed in various shapes, and thereby the container can be designed regardless of a shape of the hard container.

A device, a container, and a method of producing the same according to an embodiment of the present disclosure can hygienically and efficiently charge a content in an elastic pouch while satisfying a condition in which the elastic pouch should be expanded as large as a size of an external container in order to inject the content.

DESCRIPTION OF DRAWINGS

FIG. 1A illustrates a storage container of a viscous liquid content according to the background art.

FIG. 1B illustrates a state in a storage container when a little remaining content remains in the storage container of a viscous liquid content according to the background art.

FIG. 2A illustrates a process of charging liquids in hard containers in a common producing process for a shampoo, a lotion, and so on.

FIG. 2B illustrates a process of charging liquids in hard containers in a common producing process for a shampoo, a lotion, and so on.

FIG. 3 is a diagram illustrating a container according to an embodiment of the present disclosure.

FIG. 4 is a diagram illustrating a cross section taken along line IV-IV of FIG. 3.

FIG. 5 is a diagram illustrating the pouch assembly of FIG. 3.

FIGS. 6 and 7 are diagrams illustrating a configuration of the guide unit of FIG. 5.

FIGS. 8 to 11 are diagrams illustrating a process of charging the container of FIG. 3 with a liquid content.

FIGS. 12 and 13 are diagrams illustrating a process of discharging the liquid content to the outside in a state in which the container of FIG. 3 is charged with the liquid content.

FIG. 14 is a diagram illustrating a part of a cross section of a container according to another embodiment of the present disclosure.

FIG. 15 is a diagram illustrating a pouch unit of a container according to another embodiment of the present disclosure.

FIGS. 16 and 17 are diagrams illustrating a pouch assembly of a container apparatus according to another embodiment of the present disclosure.

FIG. 18 is a diagram illustrating a cross section in a state in which the pouch assembly of FIG. 16 is installed on an external container.

FIG. 19 is a diagram illustrating a configuration of a content charging device for a container apparatus according to yet another embodiment of the present disclosure.

FIG. 20 is a diagram illustrating a suction means of the content charging device of FIG. 19.

FIG. 21 is a diagram illustrating a state in which the suction means of FIG. 20 is installed on the container apparatus.

FIGS. 22 to 25 are diagrams illustrating a process of charging the container apparatus with a content using the content charging device of FIG. 19.

FIG. 26 is a flow chart illustrating a content charging method using the content charging device of FIG. 19.

FIG. 27 is a diagram illustrating content charging steps of the content charging method of FIG. 26.

FIG. 28 is a diagram illustrating a content charging device for a container apparatus according to still yet another embodiment of the present disclosure.

FIG. 29 is a diagram illustrating a process of charging the container apparatus with a content using the content charging device of FIG. 28.

FIG. 30 is a diagram illustrating content charging steps of the content charging method of FIG. 28.

FIG. 31 is a diagram illustrating a content charging method for a container apparatus according to still yet another embodiment of the present disclosure.

FIG. 32 is a diagram illustrating a content charging device for a container apparatus according to still yet another embodiment of the present disclosure.

FIG. 33 is a diagram illustrating a content charging device for a container apparatus according to still yet another embodiment of the present disclosure.

FIG. 34 is a diagram illustrating a state of enlarging a part of the content charging device of FIG. 33.

FIG. 35 is a diagram illustrating a state in which a suction means of the content charging device of FIG. 33 is installed on the container apparatus.

FIG. 36 is a diagram illustrating a content charging device for a container apparatus according to still yet another embodiment of the present disclosure.

FIG. 37 is a diagram illustrating a cross section of the content charging device which is taken along line A-A of FIG. 36.

FIGS. 38 and 39 are diagrams illustrating a process in which the content charging device of FIG. 36 is operated.

BEST MODE

Advantages and features of the present disclosure and methods of achieving the advantages and features will be clear with reference to exemplary embodiments to be described in detail below together with the accompanying drawings. However, the present disclosure is not limited to the exemplary embodiments disclosed herein but will be implemented in various forms. The exemplary embodiments of the present disclosure are provided so that the present disclosure is completely disclosed, and a person with ordinary skill in the art to which the present disclosure pertains can fully understand the scope of the present disclosure. The present disclosure will be defined only by the scope of the appended claims.

Terms "first", "second", and the like may be used to describe various constituent elements, but the constituent elements are of course not limited by these terms. These terms are merely used to distinguish one constituent element from another constituent element. Therefore, the first constituent element mentioned hereinafter may, of course, be the second constituent element within the technical spirit of the present disclosure.

Throughout the specification, the same reference numerals denote the same constituent elements.

Respective features of several exemplary embodiments of the present disclosure may be partially or entirely coupled to or combined with each other, and as sufficiently appreciated by those skilled in the art, various technical cooperation and operations may be made, and the respective exemplary embodiments may be carried out independently of each other or carried out together correlatively.

Potential effects, which may be expected by technical features of the present disclosure that are not specifically mentioned in the specification of the present disclosure, are treated as being described in the present specification, and the present embodiments are provided to more completely explain the present disclosure to those skilled in the art. Therefore, the contents illustrated in the drawings may be exaggeratingly expressed in comparison with actual implementation of the present disclosure, and a detailed description of a configuration will be summarized or omitted when it is determined that the description may unnecessarily obscure the subject matter of the present disclosure.

The liquid used herein is collectively called a widely liquefied state rather than a state of a solid or a gas. That is, the liquid means all states in that an intermolecular distance is short, and kinetic energy is low, but molecules are not strongly bonded like molecules of the solid state, and is used as meaning including all from viscosity-free liquids like water to high viscosity liquids like gel.

The elastic pouch used herein is commonly called a bag that is a soft bag that may have or not have a fixed appearance and has a restoring force for returning to an original shape when stretched or expanded due to elasticity while a shape thereof is changed by an external force, and a bag that is a simple soft bag whose shape is changed by an external force because it does not have a fixed appearance.

The container used herein refers to all kinds of containers that are formed of a hard material having a fixed outline such as plastic, glass, metal, paper, or the like, and may be used together with "hard container".

Hereinafter, embodiments of the present disclosure will be described in detail with reference to the accompanying drawings such that those having ordinary knowledge in the art to which the present disclosure pertains can easily carry out the embodiments. However, the present disclosure may be implemented in several different forms, and is not limited to the embodiments described here. In the drawings, in order to clearly describe the present disclosure, portions which are not related to the description of the present disclosure will be omitted, and identical or similar components are denoted by the same reference signs throughout the specification. In addition, a size and thickness of each component indicated in the drawings are arbitrarily shown for convenience of description, and thus the present disclosure is not necessarily restricted by the drawings.

FIG. 3 is a diagram illustrating a container according to an embodiment of the present disclosure, and FIG. 4 is a diagram illustrating a cross section taken along line IV-IV of FIG. 3.

Referring to FIGS. 3 and 4, a container 1 according to the present embodiment stores a liquid content $\ell$, and is characterized in that, in the process of discharging the liquid content $\ell$ to the outside to use a container apparatus 1, the liquid content $\ell$ does not remain on an inner wall of the container apparatus 1.

More specifically, the container apparatus 1 includes an external container 200 in which a storage space 211 is formed, and a pouch assembly 100 that is coupled to the external container 200 and has a pouch unit 110 that is charged with a liquid content in a state in which a part thereof is inserted into the storage space 211 of the container apparatus 1 and thereby a volume thereof is increased. That is, in the container apparatus 1 according to the present embodiment, the liquid content $\ell$ is not charged in the storage space 211 of the external container 200 but is charged in a charging space 112 of the pouch assembly 100, and thereby the liquid content $\ell$ may be used without a remnant to the utmost without the liquid content $\ell$ remaining on an inner wall of the external container 200 during use. Further, in the process of discharging the liquid content $\ell$, a volume of the charging space 112 of the pouch assembly 100 is reduced, and thereby remnant of the liquid content $\ell$ can be suppressed to the utmost.

The external container 200 includes an external container body 210 in which the storage space 211 is formed, and a neck 220 that is disposed on an upper side of the external container body 210, has a smaller diameter than the external container body 210, and has an opening 221 communicating with the storage space 211 in an upper surface thereof. For example, the external container 200 may be formed of a material having strength of a fixed magnitude for maintaining an outline, such as plastic, metal, paper, glass, or the like. Meanwhile, a configuration in which the external container 200 is formed in a cylinder shape without division between the neck 220 and the external container body 210 is also included in an embodiment of the present disclosure.

In the present embodiment, the configuration in which the storage space 211 of the external container 200 communicates with the outside through the opening 221 and no through-holes other than the opening 221 are formed in the external container 200 has been described. However, a configuration in which other through-holes or a plurality of pores other than the opening 221 are formed in the external container body 210 of the external container 200 is also included in an embodiment of the present disclosure.

The pouch assembly 100 contains a liquid content when coupled to the external container 200. The pouch assembly 100 may include the pouch unit 110 that is formed of an elastic material and has a charging space for charging a liquid therein, and a guide unit 120 into which a part of the pouch unit 110, for example a pouch unit body 111, is fitted and in which a lower surface of another part of the pouch unit 110, for example a lower surface of a pouch-side catch 114, is placed on an upper side thereof.

The pouch unit 110 is formed of, for example, an elastic material, or may be formed of an extensible material, for example a silicone, a natural or synthetic latex rubber, or a polymer material.

In a state in which a part of the pouch unit 110 is fitted into the guide unit 120, the pouch assembly 100 is installed on a side of the opening 221 of the external container 200. That is, the guide unit 120 is disposed between an inner surface of the opening 221 of the external container 200, i.e. an inner surface of the neck 220 and the pouch unit 110.

The guide unit 120 is formed of a material having a higher strength than the pouch unit 110. Therefore, in a process in which a pump for discharging the liquid content $\ell$ to the outside is coupled in a state in which the pouch assembly 100 is installed on the external container 200, a part of the pouch unit 110 can be prevented from being deformed or pushed toward the opening 221 of the external container 200 by an external force applied to the upper surface of the pouch unit 110.

In addition, by securing a preset size of fluid channels 123 disposed between the pouch unit 110 and the external container 200, the storage space 211 of the external container 200 is made possible to communicate with the outside of the container apparatus 1.

Hereinafter, a configuration of the pouch assembly 100 according to the present embodiment will be described in greater detail.

FIG. 5 is a diagram illustrating the pouch assembly of FIG. 3, and FIGS. 6 and 7 are diagrams illustrating a configuration of the guide unit of FIG. 5.

Referring to FIGS. 5 to 7, the pouch unit 110 of the pouch assembly 100 includes a pouch unit body 111 that has a charging space 112 formed therein and a pouch-side opening 113 communicating with the charging space 112 on one side thereof, a pouch-side catch 114 which is formed on one side of the pouch unit body 111 and whose outer circumference side is outwardly extended further than an outer surface of the pouch unit body 111 in a state in which the pouch-side catch 114 surrounds the pouch-side opening 113, and a selective sealing unit 115 that is disposed on an upper side of the pouch-side catch 114 and selectively opens/closes the pouch-side opening 113.

The selective sealing unit 115 includes a sealing unit body 117 that completely covers the pouch-side opening 113, and a sealing unit edge 116 that is provided on an outer side of the sealing unit body 117 and is fixed to an upper surface of the pouch-side catch 114 after being placed on the pouch-side catch 114. The sealing unit body 117 is formed of an elastic material, and is formed to be openable/closable on the basis of a slit 118 formed in the sealing unit body 117.

Meanwhile, in the present embodiment, the configuration in which the selective sealing unit 115 is placed on the pouch-side catch 114 has been described. However, a configuration in which the pouch-side catch 114 is not separately provided and the selective sealing unit 115 is provided on an end side of the pouch unit body 111 and selectively opens/closes the pouch-side opening 113 is also included in the embodiment of the present disclosure. The selective sealing unit 115 may be fixed to an end side of the pouch unit 110 in such a way that it is formed integrally with the pouch unit 110 or is formed as a separate member distinguished from the pouch unit 110.

The selective sealing unit 115 performs various functions for forming a fluid channel in the pouch unit 110. More specifically, the selective sealing unit 115 may serves as a check valve that can selectively open or close the charging space 112 in the pouch unit 110. The selective sealing unit 115 provides a structure through which a structure such as a nozzle, a pump, or the like can passes while serving as a check valve, and thereby a possibility of mass-productivity can be secured.

Further, in a state in which a pump (a dispenser) for discharging a liquid content, with which the charging space 112 is charged, to the outside is installed, a part of the selective sealing unit 115 is pushed toward the charging space 112 and secures a preset space, and thereby the selective sealing unit 115 can prevent closure of a fluid channel which is generated by close contact with an inner surface of the pouch unit 110.

In this case, a lower surface of the sealing unit body 117 is formed to protrude toward the pouch-side opening 113, and is formed in a round shape. A thickness of the sealing unit body 117 is continuously increased from an edge of the sealing unit body 117 toward the center of the sealing unit body 117. Meanwhile, a configuration in which the sealing unit body 117 is formed in a hemispherical shape or in a planar shape is also included in the embodiment of the present disclosure, and the thickness of the sealing unit body 117 may be identically formed from the edge of the sealing unit body 117 toward the center of the sealing unit body 117.

In the present embodiment, the lower surface of the sealing unit body 117 may be formed in a hemispherical shape having a diameter corresponding to a diameter of the pouch-side opening 113, and an upper surface of the sealing unit body 177 is formed in a planar shape. In this case, the slit 118 may be formed in a single line shape having a smaller size than a diameter of the sealing unit body 117. The slit 118 is in symmetry with respect to a central point of the sealing unit body 117.

When the charging space 112 of the pouch unit 110 is charged with a liquid content $\ell$, the selective sealing unit 115 is opened by a charging means 500 for charging the liquid content $\ell$, and the liquid content $\ell$ is charged toward the charging space 112 after the selective sealing unit 115 is opened. When the charging means 500 is removed after the liquid content $\ell$ is completely charged, the slit 118 of the selective sealing unit 115 is closed again by elasticity of the selective sealing unit 115, and the liquid content $\ell$ is prevented from being discharged from the charging space 112 to the outside of the pouch unit 110.

Meanwhile, the guide unit 120 is formed in an annular shape, and is formed of a material having a greater rigidity than the pouch unit 110, for example a material such as a plastic, a metal, or paper.

The guide unit 120 includes a guide unit-side through-hole 125 which is disposed in the center of the guide unit 120 and through which the pouch unit body 111 passes, and fluid channels 123 which are disposed on an outer side of the guide unit 120 relative to the guide unit-side through-hole 125 and some of which are formed in a direction parallel to the guide unit-side through-hole 125.

The guide unit 120 includes a guide unit body 121 that surrounds the guide unit-side through-hole 125 and is formed in an annular shape, and an insertion section that surrounds the guide unit-side through-hole 125, is connected with a lower surface of the guide unit body 121, and includes a plurality of insertion units 122 spaced apart from each other. In this case, some of the fluid channels 123 are disposed between the insertion units 122.

An inner diameter of the guide unit body 121 is larger than that of the guide unit-side through-hole 125, and an outer diameter of the guide unit body 121 is formed to further extend from outer surfaces of the insertion units 122 toward the outside of the guide unit 120.

The insertion units 122 of the insertion section are formed to extend in a direction in which the guide unit-side through-hole 125 is formed, i.e. in a top-down direction, and a part of an upper surface 126 of each insertion unit 122 is exposed to the outside through the guide unit-side through-hole 125. In this case, a lower surface of the pouch-side catch 114 of the pouch unit 110 is placed on the exposed part of the upper surface 126 of each insertion unit, and the pouch unit 110 is caught on the guide unit 120.

An outer diameter of the insertion section including the insertion units 122 corresponds to a diameter of the opening 221 of the external container 200, and when the insertion section is located in the opening 221, outer surfaces of the insertion units 122 of the insertion section come into close contact with an inner surface of the neck 220 of the external container 200. A lower surface 128 of the guide unit body 121 formed to radially extend outward from the insertion section is placed on an end side of the neck 220 of the external container 200.

Meanwhile, one side of each fluid channel 123 is disposed parallel to a lower end 129 of each insertion unit 122, and the other side 124 of each fluid channel 123 is disposed on an outer circumferential surface of the guide unit body 121. The other side 124 of each fluid channel 123 is formed in a shape depressed upward on the basis of the lower surface 128 of the guide unit body 121. Therefore, the fluid channels 123 are formed in a shape bent from one sides thereof toward the other sides thereof. For example, the fluid channels 123 are formed in a shape bent by an angle of about 90°.

The one sides and the other sides 124 of the fluid channels 123, which communicate with one another, cause the storage space 211 adjacent to the container to communicate with the outside of the container 200, and thereby the fluid channels 123 cause the storage space 211 adjacent to the container and the outside of the container 200 to communicate with each other.

Hereinafter, a process of charging the container apparatus 1 according to an embodiment of the present disclosure with a liquid content $\ell$ will be described in detail.

FIGS. 8 to 11 are diagrams illustrating a process of charging the container of FIG. 3 with a liquid content.

First, referring to FIG. 8, the pouch assembly 100 in which the pouch unit 110 is coupled to the guide unit 120 is installed on the side of the opening 221 of the external container 200, and the charging means 500 is moved toward the selective sealing unit 115 of the pouch assembly 100. When the charging means 500 presses a central side of the selective sealing unit 115 at a pressure over a preset magnitude, the slit 118 of the selective sealing unit 115 is opened, and a part of the charging means 500 is inserted into the charging space 112 of the pouch unit 110.

In this case, a part of a sealing unit body 117 can be rolled toward the container-side opening 221 in the process of inserting the charging means 500.

Next, referring to FIG. 9, a part of the charging means 500 is inserted into the charging space 112 of the pouch unit 110, and an end 510 of the charging means 500 comes into contact with an end of the pouch unit 110. In this state, when the charging means 500 is continuously lowered, the pouch unit 110 is extended toward a lower inner surface of the container 200. When the end of the pouch unit 110 reaches a preset position that does not come into contact with the lower inner surface of the container 200, the movement of the charging means 500 is stopped.

The end of the charging means 500 may be formed in a round shape in order to suppress damage of the contacted pouch unit 110, and the end of the pouch unit 110 may also be formed in a round shape. A high pressure may be applied to a portion at which the end of the charging means 500 comes into direct contact with the pouch unit 100. Therefore, a supply hole 511 formed in the end of the charging means 500 may be formed to extend to a lateral surface of the end of the charging means 500 such that a content can be discharged even if the end of the charging means 500 is pressed by the pouch unit 100. Further, the supply hole 511 may be formed not in the center of the end of the charging means 500 but at an eccentric position in the center.

Next, referring to FIG. 10, the liquid content $\ell$ is supplied to the charging space 112 of the pouch unit 110 through the supply hole 511 formed in the end 510 of the charging means 500 in the state in which the pouch unit 110 is extended. In this case, a discharge pressure at which the charging means 500 supplies the liquid content $\ell$ is greater than a restoring force of the pouch unit 110. Therefore, with the supply of the liquid content $\ell$, the pouch unit 110 may be expanded until its shape corresponds to a shape of the external container, and a volume of the charging space 112 may also be increased. In a state in which the pouch unit 110 is sufficiently extended, the liquid content $\ell$ is supplied to the charging space 112, and thereby the expansion of the pouch unit 110 may lead to a desired volume and shape.

As the volume of the charging space 112 of the pouch unit 110 is increased, a volume of the storage space 210 of the external container 200 in which the charging space 112 of the pouch unit 110 is located is reduced. As the volume of the storage space 210 is reduced, air a of the storage space 210 is discharged to the outside along the fluid channels 123 of the guide unit 120. That is, due to the volume reduction of the storage space 210, the air a of the storage space 210 should be essentially discharged. In the container apparatus 1 according to the present embodiment, the fluid channels 123 for communication between the storage space 210 and the outside are formed, thereby enabling the air a to be smoothly discharged.

In this case, in the process of the charging means 500 supplying the liquid content $\ell$, a position of the charging means 500 is maintained. When the liquid content $\ell$ is completely charged, the charging means 500 is moved backward.

Meanwhile, a configuration in which the charging means 500 minimizes adhesion of the liquid content $\ell$ to an outer circumferential surface thereof while supplying the liquid content $\ell$, and is set to a preset speed in order to suppress interference of the charging of the liquid content $\ell$ due to the volume of the charging means 500 is also included in the embodiment of the present disclosure. In this case, a rising speed of the charging means 500 may, for example, be formed at a magnitude at which a height of the liquid content $\ell$ is increased in the charging space 112 of the pouch unit 110.

Next, referring to FIG. 11, when the charging of the liquid content $\ell$ is completed and the charging means 500 is completely separated from the charging space 112, the selective sealing unit 125 is restored to an original shape again, and the slit 118 of the selective sealing unit 125 is maintained in a closed state. That is, the selective sealing unit 125 formed of an elastic material provides an elastic force toward the slit 118 and thereby the slit 118 is closed, and the liquid content $\ell$ can be inhibited from being discharged to the outside through the slit 118.

The pouch unit body 111 of the container apparatus 1 according to an embodiment of the present disclosure is formed to be long in an up-down direction. When the liquid content is contained in the charging space of the pouch unit body 111, an up-down length of the pouch unit body 111 may be extended to 150% to 1000%, compared to a state in which a separate pressure is not applied to the pouch unit body 111, and a left-right width of the pouch unit body 111 may be extended to 150% to 1000%.

In the state in which the pouch unit body 111 is charged with the liquid content $\ell$, a restoring force of the pouch unit body 111 is greater than a load of the liquid content $\ell$. Therefore, when a configuration for suppressing discharge of the liquid content $\ell$ is not provided to the pouch unit 110, the liquid content $\ell$ is discharged through the pouch-side opening 113 of the pouch unit 110. Therefore, the selective sealing unit 115 of the container apparatus 1 according to the present embodiment inhibits the liquid content $\ell$ from being discharged to the outside through the pouch-side opening 113 of the pouch unit 110 in the state in which the slit 118 is closed, and thereby the process of charging the liquid content $\ell$ can be made to be smoothly performed even if a separate process of blocking a fluid channel that discharges air to the outside of the external container 200 or suctioning air through the fluid channel is not maintained.

Hereinafter, a process of discharging the liquid content $\ell$ to the outside in the container apparatus 1 will be described in detail.

FIGS. 12 and 13 are diagrams illustrating a process of discharging the liquid content to the outside in a state in which the container of FIG. 3 is charged with the liquid content.

First, referring to FIG. 12, the container apparatus 1 according to the present embodiment further includes a pump unit 600 for discharging the liquid content $\ell$, with which the charging space 113 is charged, to the outside.

The pump unit 600 includes a pump unit body 610 that is installed on the neck 220 of the external container 200, a head 620 that is disposed to be moveable up and down relative to the pump unit body 610 in a top-down direction and has a discharge fluid channel 621 formed therein, an elastic means 660 that provides an elastic force against the head 620 in a top-down direction, a support unit 640 on which the elastic means 660 is supported, and a pumping pipe 630, one side of which communicates with the discharge fluid channel 621 and the other side of which passes through the slit 118 of the sealing unit 115 and is disposed in the charging space 112.

When a user presses the head 620 to open the discharge fluid channel 621, the liquid content $\ell$ stored in the charging space 112 can be discharged to the outside through the pumping pipe 630 and the discharge fluid channel 621 by a pressure caused by the pressing of the head 620.

In this case, in proportion to a volume by which the liquid content $\ell$ is discharged to the outside, i.e. in proportion to a volume by which the charging space 112 is reduced, air from the outside is introduced toward the storage space 211 of the external container 200 through the fluid channels 123.

Next, referring to FIG. 13, when most liquid content $\ell$ is discharged and then the liquid content $\ell$ is continuously discharged, a volume of the pouch unit 110 is reduced to a magnitude smaller than a volume of the liquid content $\ell$ before being charged.

The pouch unit 120 has a pouch contact region $Z_2$ with which the inner surface of the pouch unit body 111 comes into contact in a state in which a part of an inner surface of the pouch unit body 111 comes into contact therewith and which is formed around the center of the pouch unit body 111, and a pouch non-contact region $Z_1$ which is formed outside the pouch contact region $Z_2$ and with which the inner surface of the pouch unit body 111 does not come into contact. The other side 631 of the pumping pipe 630 communicates with the pouch non-contact region $Z_1$.

In the pouch contact region $Z_2$, the inner surface of the pouch unit body 111 comes into contact with each other. Thereby, a discharge pressure is not normally applied, and thus the discharge of the remaining liquid content $\ell$ may be restricted.

The pouch unit body 110 of the container apparatus 1 according to the present embodiment is formed of an elastic material in a cylindrical shape. When the volume of the pouch unit body 110 is reduced by outflow of the liquid content $\ell$, the pouch contact region $Z_2$ is formed in the center, and the pouch non-contact region $Z_1$ is formed outside the pouch contact region $Z_2$. The other side 631 of the pumping pipe 630 communicates with the pouch non-contact region $Z_1$. Thereby, the discharge of the remaining liquid content $\ell$ can be made smooth.

That is, when an end of the pumping pipe 630 is inserted into the charging space 112 of the pouch unit 110 through the selective sealing unit 115, a part of the sealing unit body 117 is pushed toward the charging space 112. As a part of the sealing unit body 117 is pushed toward the pouch charging space 112 and a position adjacent to the pouch-side opening 113, a preset size of space by which the pouch non-contact region $Z_1$ is prevented from extending toward the pouch-side opening 113 may be formed.

In the present embodiment, the configuration in which the storage space 211 of the external container 200 communicates with the outside through only the fluid channels 123 in the state in which the pouch assembly 100 is installed on the external container 200 has been described. However, a plurality of holes or pores for communication between the outside and the storage space 211 may also be formed in the external container body 210 of the external container 200, which is included in an embodiment of the present disclosure. In this case, the pouch assembly 100 may be installed on the external container 200 without a separate guide unit 120.

According to a proposed embodiment, a container in which the liquid content $\ell$ can remain to a minimum can be proposed.

Further, there is an advantage in that a process of charging a container in which a pouch is installed on an external container with the liquid content $\ell$ may be performed in an easy and reliable way.

FIG. 14 is a diagram illustrating a part of a cross section of a container apparatus according to another embodiment of the present disclosure.

The present embodiment only has a difference in a configuration of the selective sealing unit of the container apparatus, and the other configurations are substantially the same as the configurations of the container apparatuses of FIGS. 1 to 13, and thus the following description will be made focusing on the characteristic portions of the present embodiment.

Referring to FIG. 14, an upper surface of the sealing unit body 117 of the container apparatus 1 according to an embodiment of the present disclosure may be depressed toward a lower surface of the sealing unit body 117. For example, a thickness of the sealing unit body 117 may be identically formed from an edge toward the center of the sealing unit body 117.

FIG. 15 is a diagram illustrating a pouch unit of a container apparatus according to another embodiment of the present disclosure.

The present embodiment only has a difference in a configuration of the selective sealing unit of the container apparatus, and the other configurations are substantially the same as the configurations of the container apparatuses of FIGS. 1 to 13, and thus the following description will be made focusing on the characteristic portions of the present embodiment.

Referring to FIG. 15, the slit 118 of the sealing unit 115 according to an embodiment of the present disclosure is disposed in the center of the sealing unit body 117, and may include two or more lines 119 that are radially disposed from the center C of the sealing unit body 117. For example, the slit 118 includes three lines 119, and the three lines 119 are disposed at an angle identical to one another.

FIGS. 16 and 17 are diagrams illustrating a pouch assembly of a container apparatus according to another embodiment of the present disclosure. FIG. 18 is a diagram illustrating a cross section in a state in which the pouch assembly of FIG. 16 is installed on an external container.

The present embodiment only has a difference in a configuration of the pouch assembly, and the other configurations are substantially the same as the configurations of the container apparatuses of FIGS. 1 to 13, and thus the following description will be made focusing on the characteristic portions of the present embodiment.

Referring to FIGS. 16 to 19, the pouch assembly 300 according to the present embodiment includes a pouch unit body 311, a pouch-side catch 314, a selective sealing unit 315, and a plurality of guides 320.

The plurality of guides 320 are disposed at positions adjacent to a pouch-side opening 313 of a pouch unit 310, and are formed integrally with the pouch unit body 311 and the pouch-side catch 314. The plurality of guides 320 are formed of the same elastic material as the pouch unit body 311 and the pouch-side catch 314, and are radially formed to protrude outward from an outer circumferential surface of the pouch unit body 311.

Any one of the guides 320 is separated from the other neighboring guide 320 at a preset distance in a circumferential direction of the pouch-side catch 314, i.e. the circumference of the catch 114, and fluid channels 323 are defined by separated spaces of the guides 320. The plurality of fluid channels 323 are each defined by the outer surface of the pouch unit body 311 and a lower surface of the pouch-side catch 314, and cause the storage space 211 of the external container 200 to communicate with the outside of the container apparatus 1.

Each of the guides 320 includes a first region 321 that is disposed on an outer surface of the pouch unit body 311, and a second region 322 that is formed in a shape bent from the first region 321 and is disposed on the lower surface of the pouch-side catch 314.

An inner surface of the first region 321 coming into contact with the pouch unit body 311 is formed to have a curvature corresponding to that of the outer surface of the pouch unit body 311, and an outer surface of the first region 321 is also formed to have a curvature corresponding to that of the inner surface of the first region 321. A horizontal cross section of the first region 321 is formed in a sector shape, and a thickness of a vertical cross section of the first region 321 is increased from the inner surface of the first region 321 toward the outer surface of the first region 321.

The second region 322 is formed in a sector shape in which a thickness of a vertical cross section thereof is increased from one side of the second region 322 connected to the first region 321 toward the other side of the second region 322 disposed under the edge of the pouch-side catch 314. In this case, the other side of the second region 322 may be formed with the same curvature as the edge of the pouch-side catch 314.

The horizontal cross section of the first region 321 is formed to have a curvature corresponding to that of the outer surface of the pouch unit body 311, and a horizontal cross section of the second region 322 is also formed to have a curvature corresponding to that of the outer surface of the pouch unit body 311. Thereby, the fluid channel 323 between one guide 320 and the neighboring guide 320 is formed to have a uniform width in a process of extending from an end of the first region 321 toward an end of the second region 322.

Meanwhile, the first region 321 and the second region 322 are connected in a state bent at an angle of 90°, and thereby stress is concentrated on a portion at which the first region 321 and the second region 322 are connected. To prevent the first region 321 and the second region 322 from being damaged by the stress, a stress distribution part 324 may be slantly formed at the connected portion between the first region 321 and the second region 322. In a state in which the pouch assembly 300 is installed on the external container 200, a corner of the neck 220, i.e. a container-side opening of the external container 200, may come into contact with the stress distribution part 324.

In a state in which the pouch assembly 300 is coupled to the external container 200, the outer surface of the first region 321 comes into close contact with the inner surface of the external container 200, and the outer surface of the second region 322 comes into close contact with an edge of the container-side opening 221 of the external container 200, i.e. the end of the neck 220.

Therefore, the container-side opening 221 may communicate with the outside only through the fluid channels 323 defined by the guides 320.

Meanwhile, the sealing unit body 117 is depressed toward the container-side opening 221 of the external container 200, and a depression r depressed downward is formed at an upper portion of the sealing unit body 117.

According to a proposed embodiment, the plurality of guides 320 are formed integrally with the pouch assembly 300, and thus there is an advantage that a process of producing the container apparatus 1 is simplified.

FIG. 19 is a diagram illustrating a configuration of a content charging device for a container apparatus according to yet another embodiment of the present disclosure. FIG. 20 is a diagram illustrating a suction means of the content charging device of FIG. 19. FIG. 21 is a diagram illustrating a state in which the suction means of FIG. 20 is installed on the container apparatus.

The present embodiment relates to a content charging device for charging a container apparatus with a content $\ell$ of a liquid state. Because a configuration of the container apparatus is substantially the same as that of the container apparatus FIGS. 1 to 13, the following description will be made centering on characteristic portions of the present embodiment.

Referring to FIGS. 19 to 21, a content charging device for a container apparatus according to yet another embodiment of the present disclosure includes a charging means 500, a suction means 700, a content supplying means 910, and a suction pump 920.

More specifically, the charging means 500 is inserted into a charging space of a pouch unit 310, has flow holes 511 and 512 which are formed in one side thereof and through which air or a content flows, and is formed to be slidable from the vicinity of a pouch-side opening 313 of the pouch unit 310 toward an end of the pouch unit 310.

The charging means 500 is formed long in a vertical direction, and is connected to the content supplying means 910 for supplying a liquid content $\ell$. The content supplying means 910 communicates with the flow holes 511 and 512 through an internal fluid channel of the charging means 500.

The flow holes 511 and 512 are formed in an end of the charging means 500 inserted into the charging space 311 of the pouch unit 310. The flow holes 511 and 521 include a central flow hole 511 located in the center of the end of the charging means 500 and lateral flow holes 512 that are located at positions away from the center of the end and communicate with the central flow hole 511.

In the present embodiment, the lateral flow holes 512 are formed in a pair, and are formed in a shape that extends to a circumference of the end of the charging means 500.

In the present embodiment, the flow holes 511 and 512 have the central flow hole 511 and the lateral flow holes 512, and thus the central flow hole 511 comes into close contact with an inner surface of the pouch unit 310 in a state in which the charging means 500 stretches the pouch unit 310, so that a limitation on the discharge of the content $\ell$ can be suppressed. The pair of lateral flow holes 512 are formed in a shape symmetrical with respect to the central flow hole 511, so that there is an advantage that the pouch unit 310 can be uniformly stretched during the discharge of the content $\ell$.

Meanwhile, the suction means 700 is installed on a neck 220 of an external container 200, surrounds fluid channels 323 for discharging air between the external container 200 and the pouch unit 310 to the outside in the process in which the pouch unit 310 is stretched, and communicates with the suction pump 920 for suctioning air flowing through the fluid channels 323.

The fluid channels 323 are formed between a part of an opening inner wall of the external container 200 and a pouch assembly 300 including the pouch unit 310, and provide communication between a storage space 211 of the external container 200 and the outside of the external container 200.

More specifically, the suction means 700 includes a suction means body 710 that surrounds one end of each fluid channel 323 of the pouch unit 310 and has an inner surface spaced apart from the one end of each fluid channel 323 and a suction space 711 formed between the inner surface and the container apparatus, and an elastic member 730 that is disposed between the suction means body and an outer surface of the external container 200 and comes into close contact with the outer surface of the external container 200.

A suction hole 712 communicating with the suction space is formed in the suction means body 710, and a charging means insertion hole 713 into which the charging means 500 is slidably inserted is formed in an upper surface 720 of the suction means body 710. In this case, the charging means insertion hole 713 is aligned next to the pouch-side opening 313 of the pouch unit 310.

Meanwhile, the suction means body 710 may further include a connector 740 that is formed to protrude from one side of the suction means body 710, surrounds the suction hole 712, and is connected to the suction pump 920.

That is, a lower side of the suction means body 710 according to the present embodiment is open to be able to be installed on the external container 200. In a state in which the suction means body 710 is installed on the external container 200, the suction space 711 of the suction means body 710 communicates with the outside only through the suction hole 712 and the charging means insertion hole 713 of the suction means body 710. In the present embodiment, it is described that the charging means insertion hole 713 opens to the outside. However, in the case where a pipe structure (not illustrated) in which the charging means 500 is slidably disposed is installed in the charging means insertion hole 713, the suction space 711 may communicate with the outside only through the suction hole 712 in a state in which the suction means 700 is installed on the external container 200.

Moreover, in the process of charging a charging space 312 of the pouch unit 310 with a liquid content $\ell$, the suction means 700 discharges air of the storage space 211 between the pouch unit 310 and the external container 200 to the outside, and reduces a pressure of the storage space 211, whereby the pouch unit 310 can be stretched under a lower pressure and be uniformly stretched.

Hereinafter, a content charging method of the container apparatus 1 using the content charging device according to the present embodiment will be described in detail.

FIGS. 22 to 25 are diagrams illustrating a process of charging the container apparatus with a content using the content charging device of FIG. 19. FIG. 26 is a flow chart illustrating a content charging method using the content charging device of FIG. 19, and FIG. 27 is a diagram illustrating content charging steps of the content charging method of FIG. 26.

As described above, the pouch assembly 300 of the container apparatus 1 further includes a selective sealing unit 315 that is installed in the pouch-side opening 313 and selectively opens/closes the pouch-side opening 313. The sealing unit 315 is formed of an elastic material, and is openable/closable on the basis of a slit 318 formed in the sealing unit body 315.

First, referring to FIGS. 22 and 26, the external container 200 is prepared along with the container apparatus 1 including the pouch coupled to the external container 200 such that the charging space 312 of the pouch assembly 300 is located in the storage space 211 of the external container 200 (container preparing step S100).

In the container preparing step S100, the suction means 700 is installed on the neck 220 of the external container 200 and, in this state, when the charging means 500 is aligned with the charging means insertion hole 713 of the suction means 700, the charging means 500 is lowered toward the depression of the container apparatus 1.

A diameter of the end of the charging means 500 may, for example, be smaller than or equal to that of the depression r.

Next, referring to FIGS. 23 and 26, a part of the charging means 500, i.e. the end of the charging means 500, is inserted into the charging space 311 through the pouch-side opening 312 of the pouch assembly 300 at one side of the external container 200, and then the charging means 500 is moved toward the other side of the external container 200, thereby stretching the pouch unit 310 of the pouch assembly 300 (pouch stretching step S200).

In this case, the charging means 500 presses and opens the slit 318 of the sealing unit 315, and then a part thereof, i.e. the end thereof in which the flow holes 511 and 521 are formed, is inserted into the charging space 311 of the pouch unit 310.

The pouch stretching step S200 is performed, air a of the storage space 211 of the external container 200, which communicates with the suction hole 712, the suction space 711, and the fluid channels 323 of the pouch assembly 300, is discharged to the outside through the suction hole 712 of the suction means 700 (external container pressure reducing step S300). When the external container pressure reducing step S300 is performed, a pressure of the storage space 211 becomes smaller than the atmospheric pressure.

Next, referring to FIGS. 24 to 26, the charging space 311 of the pouch unit 310 is charged with a content $\ell$ (content charging step S400).

In the content charging method using the content charging device according to the present embodiment, the pouch unit 310 is stretched downward, and the air a of the storage space 211 of the external container 200 is discharged so that the internal pressure of the storage space 211 becomes smaller than the atmospheric pressure. In this state, as the content charging step S400 is performed, the content ℓ is relatively easily charged, and there is an advantage that the pouch unit 310 charged with the content ℓ can be uniformly stretched.

That is, in a state in which the pouch unit 310 is not stretched downward, when the content ℓ is sprayed through the flow holes 511 and 512 of the charging means 500, the inner wall of the external container 200 comes into contact with the outer surface of the pouch unit 310 in a state in which the pouch unit 310 is not completely stretched, which causes a problem that the stretching and content charging of the pouch unit 310 are restricted or the pouch unit 310 is damaged. In addition, in a state in which the pressure of the storage space 211 of the external container 200 is the same as the atmospheric pressure, when the content ℓ is sprayed through the flow holes 511 and 512 of the charging means 500, the stretching and charging of content ℓ of the pouch unit 310 are restricted, that is, the pouch unit 310 is not stretched to inner corner portions of the external container 200, which causes a problem that the pouch unit 310 cannot be charged with the content ℓ as much as a desired volume.

In the present embodiment, in the state in which the pouch unit 310 is sufficiently stretched downward and the pressure of the storage space 211 is reduced, the charging space 312 of the pouch unit 310 is charged with the content ℓ, whereby the content ℓ can be smoothly charged.

In the content charging step S400, in a state in which the pouch unit 310 is extended first, the content ℓ is supplied to the charging space 312 through the flow holes 511 and 512 of the charging means 500 (content spraying step S411).

In the content spraying step S411, the charging space 312 of the pouch unit 310 is expanded in a left-right direction intersecting a direction in which the pouch unit 310 is extended in the pouch stretching step S200.

Next, the charging space 312 of the pouch unit 310 is charged with the content ℓ as much as a preset volume, and then the charging means 500 is retreated from the charging space 312 of the pouch unit 310 (charging means retreating step S412).

In the charging means retreating step S412, when the charging means 500 is completely retreated from the charging space 312, the slit 318 of the sealing unit 315 is closed again, thereby preventing the content ℓ from being discharged to the outside of the charging space 312.

Meanwhile, in the process of charging the charging space 312 with the content ℓ, the pressure of the storage space 211 can be kept lower than the atmospheric pressure.

According to the proposed embodiment, there is an advantage in that the pouch unit 310 charged with the content ℓ can be uniformly stretched.

FIG. 28 is a diagram illustrating a content charging device for a container apparatus according to still yet another embodiment of the present disclosure. FIG. 29 is a diagram illustrating a process of charging the container apparatus with a content using the content charging device of FIG. 28. Also, FIG. 30 is a diagram illustrating content charging steps of the content charging method of FIG. 28.

The present embodiment has a difference in a configuration in which the charging means is connected to a sucking/exhausting means for sucking or exhausting air, and has no difference in the other configurations of the content charging device and method of FIGS. 19 to 25. Thus, the following description will be made centering on characteristic portions of the present embodiment.

Referring to FIGS. 28 to 30, a charging means 500 of a content charging device according to the present embodiment is connected to a content supplying means 910 for supplying a content ℓ and a sucking/exhausting means 930 for sucking or exhausting air. Flow holes 511 and 512 of the charging means 500 selectively communicate with the content supplying means 910 and 'the sucking/exhausting means 930, and a content ℓ or air can flow through the flow holes 511 and 512.

In this case, a first valve unit 941 and a second valve unit 942 for providing selective communication between the charging means 500 and the content supplying means 910 and between the charging means 500 and 'the sucking/exhausting means 930 may be installed between the charging means 500 and the content supplying means 910 and between the charging means 500 and 'the sucking/exhausting means 930. A filter unit (not illustrated) for preventing a content ℓ, which remains in a fluid channel between the charging means 500 and the sucking/exhausting means 930, from moving toward the sucking/exhausting means 930 may be further installed between the second valve unit 942 and the sucking/exhausting means 930.

The charging means 500 of the content charging device according to an embodiment of the present disclosure embodiment supplies a charging space 312 with air supplied from the sucking/exhausting means 930 in a state in which a pouch unit 310 is stretched, and extends the charging space 312. In a state in which the charging space 312 is sufficiently extended, the charging means 500 discharges a content ℓ supplied from the content supplying means 910 to the charging space 312, whereby the charging space 312 can be charged with the content ℓ. In this case, the air existing in the charging space 312 can be discharged to the outside through a space between the charging means 500 and a slit 318 of a sealing unit 315.

In the present embodiment, it is described that the air existing in the charging space 312 is configured to be discharged to the outside through the space between the charging means 500 and the slit 318 of the sealing unit 315, but a configuration in which air is discharged to the outside through a separate discharge hole (not illustrated) distinguished from the flow holes 511 and 512 of the charging means 500 is also included in the embodiment of the present disclosure.

Hereinafter, a content charging method according to the present embodiment will be described in detail.

A content charging step S400 of the content charging method according to the present embodiment includes a pouch expanding step S421 of supplying air to the charging space 312 through the flow holes 511 and 512 in a state in which a pouch unit 310 is extended, and expanding the pouch unit 310 as much as a preset volume, and a content spraying step S422 of supplying a content ℓ to the charging space 312 through the flow holes 511 and 512 after the pouch unit 310 is expanded as much as a preset volume.

In the pouch expanding step S421, a flow between the flow holes 511 and 512 and 'the sucking/exhausting means 930 is activated. In the content charging step S422, a flow between the flow holes 511 and 512 and the content supplying means 910 is activated.

In the content spraying step S422, the charging means 500 is moved in a direction retreated from the charging space 312 at a preset speed while a content $\ell$ is supplied to the charging space 312.

For example, the speed at which the charging means 500 is retreated from the charging space 312 may be set interlocked with a speed at which the charging space 312 is charged with a content $\ell$. That is, the moving speed of the charging space 312 may be formed to correspond to a speed at which a content $\ell$ rises in the charging space 312.

The charging means 500 is moved at a speed at which a content $\ell$ rises, whereby even a high-viscosity content $\ell$ can be completely charged in the charging space 312. An end of the charging means 500 is always located outside a level of the content $\ell$, whereby it is possible to prevent the content $\ell$ from adhering to an outer surface of the charging means 500.

FIG. 31 is a diagram illustrating a content charging method for a container apparatus according to still yet another embodiment of the present disclosure.

The present embodiment has a difference in a configuration in which a pressure of a charging space of a pouch unit is reduced after a pouch stretching step, and has no difference in the other configurations of the content charging device and method of FIGS. 28 to 30. Thus, the following description will be made centering on characteristic portions of the present embodiment.

Referring to FIG. 31, a content charging method according to the present embodiment includes a pouch pressure reducing step S500 of reducing a pressure of the charging space 312 of the pouch unit 310 through the flow holes 511 and 512 formed in the end of the charging means 500 after the pouch stretching step S200 is performed.

When the pouch pressure reducing step S500 is performed, the internal pressure of the charging space 312 of the pouch unit 310 becomes lower than that of a storage space 211 of an external container 200, and an inner surface of the pouch unit 310 comes into close contact with an outer surface of the charging means 500.

In the pouch pressure reducing step S500, the flow holes 511 and 512 communicate with a sucking/exhausting means 930. The pouch pressure reducing step 3500 is performed prior to the external container pressure reducing step S300. That is, the pouch pressure reducing step S500 is performed prior to the external container pressure reducing step S300 of reducing a pressure of the storage space 211, whereby there is an advantage that, in the process of performing the external container pressure reducing step S300, a part of the pouch unit 310 can be prevented from being pushed toward the suction means 700 or being deformed by a pressure difference.

FIG. 32 is a diagram illustrating a content charging device for a container apparatus according to still yet another embodiment of the present disclosure.

The present embodiment has a difference in a configuration of a suction means, and has no difference in the other configurations of the content charging device of FIGS. 19 to 25. Thus, the following description will be made centering on characteristic portions of the present embodiment.

Referring to FIG. 32, the suction means 700 further includes a pouch unit edge pressing unit 750 that presses an upper edge of the pouch unit 310, which is seated on the end of the external container 200, toward the end of the external container 200.

That is, the pouch unit edge pressing unit 750 of the suction means 700 presses a part of the pouch unit 310 toward an edge of an opening 221 for the external container, whereby a part of the pouch unit 310 can be prevented from being separated into the opening 221 for the external container by an external force generated in the process of the charging means 500 passing through the slit 318 of the sealing unit 315.

The pouch unit edge pressing unit 750 includes a pressing bracket 751 that is formed to protrude from an inner surface of a suction means body 710 toward the suction space 711 and is formed in an annular shape, and an elastic pressing part 752 that is disposed on a lower side of the pressing bracket 751, is formed in an annular shape corresponding to the pressing bracket 751, and has a lower surface coming into contact with an upper surface of the upper edge of the pouch unit 310. In this case, the pressing bracket 751 and the elastic pressing part 752 are formed in a size corresponding to a diameter of the sealing unit 315 of the pouch unit 310, and the elastic pressing part 752 formed of an elastic material comes into contact with the pouch unit 310, whereby damage to the pouch unit 310 can be prevented.

In this case, the pressing bracket 751 may be formed of a plastic or metal material having higher hardness than the elastic pressing part 752.

FIG. 33 is a diagram illustrating a content charging device for a container apparatus according to still yet another embodiment of the present disclosure. FIG. 34 is a diagram illustrating a state of enlarging a part of the content charging device of FIG. 33. FIG. 35 is a diagram illustrating a state in which a suction means of the content charging device of FIG. 33 is installed on the container apparatus.

The present embodiment has a difference in a configuration of a suction means, and has no difference in the other configurations of the content charging device of FIGS. 19 to 25. Thus, the following description will be made centering on characteristic portions of the present embodiment.

Referring to FIGS. 33 to 35, a pouch unit edge pressing unit 760 includes a pressing bracket 761 that is disposed in a suction space 711 of a suction means body 710 so as to be movable in a vertical direction and presses the upper edge of a pouch unit 310 toward an external container 200, and an elastic unit 764 that provides an elastic force to the pressing bracket 761 in a vertical direction.

An elastic member 730 installed on a lower side of the suction means body 710 includes a first region 731 that comes into contact with an end of the suction means body 710, and a second region 732 that extends from the first region 731 toward the center of the suction means 700 and has an elastic member-side through-hole 733 which is formed in the center thereof and in which a part (a neck 220) of the external container is located.

The pressing bracket 761 includes a pressing region 762 that brings the upper edge of the pouch unit 310 into close contact with the end of the external container 200, and a supporting region 763 that is formed outside the pressing region 762 so as to surround the pressing region 762 and is placed on an upper surface of the second region 732 of the elastic member 730.

An outer diameter of the pressing region 762 is formed in a size corresponding to a diameter of the elastic member-side through-hole 733, and a step is formed between the pressing region 762 and the supporting region 763. Therefore, in a state in which the supporting region 763 of the pressing bracket 761 is placed on the upper surface of the second region 732 of the elastic member 730, the pressing region 762 is located adjacent to the elastic member-side through-hole 733, and a part of the pressing bracket 761 is caught in the elastic member 730 and thus can be prevented from being demounted from the suction space 711.

The elastic unit 764 may be, for example, a spring. One side of the elastic unit 764 comes into contact with an inner surface of the suction means body 710 (more specifically, an upper portion 720 of the suction means), and the other side of the elastic unit 764 comes into contact with the pressing region 762 of the pressing bracket 761.

An elastic unit fixing bracket 721 on which the one side of the elastic unit 764 is installed may be formed on the inner surface of the suction means body 710. The elastic unit fixing bracket 721 may be formed to have a diameter corresponding to an inner diameter of the one side of the elastic unit 764.

Hereinafter, a process in which the pouch unit edge pressing unit 760 of the content charging device according to an embodiment of the present disclosure presses the pouch unit 310 will be described in detail.

Before the suction means 700 of the content charging device is installed on the container apparatus 1, the pressing bracket 761 of the pouch unit edge pressing unit 760 is disposed on an upper side of the elastic member 730 in a caught state, and the elastic unit 760 provides an elastic force toward the pressing bracket 761 in a direction in which the pressing bracket 761 comes into close contact with the elastic member 730.

Next, when the suction means 700 is installed on the container apparatus 1, the pressing bracket 761 moves in a direction away from the elastic member 730, i.e. in an upward direction by a height at which the neck 220 of the external container 200 protrudes on an upper side of the external container body 210. In this case, the elastic unit 764 provides an elastic force to the pressing bracket 761 in a direction toward the elastic member 730, i.e. in a downward direction. The pressing region 762 brought into contact with the upper edge of the pouch unit 310 by the elastic force presses the upper edge toward the external container 200, whereby a state in which the pouch assembly 300 is installed on the external container 200 can be stably maintained.

According to the proposed embodiment, even when the neck 220 is formed at various heights, the suction means 700 that can be installed on the external container 200 is provided, whereby there is an advantage that efficiency of charging the container apparatus with the content can be increased.

FIG. 36 is a diagram illustrating a content charging device for a container apparatus according to still yet another embodiment of the present disclosure, and FIG. 37 is a diagram illustrating a cross section of the content charging device which is taken along line A-A of FIG. 36.

The present embodiment has only a difference in a configuration of a pouch unit edge pressing unit, and has no difference in the other configurations of the content charging device of FIGS. 32 to 35. Thus, the following description will be made centering on characteristic portions of the present embodiment.

Referring to FIGS. 36 and 37, a suction means 800 of the content charging device 1 according to the present embodiment includes a suction means body 810, a suction fluid channel connector 840 that communicates with a suction space 811 inside the suction means body 810 and causes air in the suction space 811 to flow to the outside, a suction means slider 860 that is formed to extend long in a vertical direction and is installed to enable the suction means body 810 to slide in a vertical direction, and a pouch unit edge pressing unit 850.

The pouch unit edge pressing unit 850 of the suction means 800 includes a pressing bracket 851 that is disposed in the suction space 811 of the suction means body 810 so as to be movable in a vertical direction and presses the upper edge of the pouch unit 310 toward the external container 200, an elastic unit 852 that provides an elastic force to the pressing bracket 851 in a vertical direction, and a pair of guide brackets 852 which are formed to extend in the same direction as the moving direction of the pressing bracket 851, into which a part of the pressing bracket 851 is fitted, and which are fixed to an inner surface of the suction means body 810 at one side thereof.

In this case, a pressing region of the pressing bracket 851, i.e. a region where the pressing bracket 851 faces the pouch unit 310, is formed in a circular shape, a charging means insertion hole 855 into which the charging means 500 is slidably inserted is formed in the center of the pressing bracket 851, and one surface of the pressing region which comes into contact with one surface of an edge 316 of the pouch unit 300 is formed in a planar shape. The elastic unit 852 is disposed in the rear of the pressing region, i.e. on the opposite side of the edge 316 of the pouch unit 300, and enables the pressing region to stably press the pressing bracket 851 toward the edge 316. In this case, the elastic unit 852 may be disposed at numerous positions of the pressing region.

For example, the pressing region may be formed to be smaller than or equal to the pressing bracket 851. In the present embodiment, the pressing region is formed in a smaller size than the pressing bracket 851. That is, the pressing region of the pressing bracket 851 does not come into contact with the pouch unit 310, and a region of the pressing bracket 851 other than the pressing region comes into contact with the upper surface of the edge 316 of the pouch unit 310.

Further, an outer diameter of the pressing bracket 851 is formed to be smaller than that of the edge 316 of the pouch unit 310, and is formed to be larger than an inner diameter of the edge 316, i.e. a diameter of a depression r. An inner diameter of the pressing bracket 851, i.e. a diameter of the charging means insertion hole 855, is formed to be smaller than that of the edge 316.

Therefore, the pressing bracket 851 concentrically presses a portion of the edge 316 of the pouch unit 310 which is adjacent to the depression r into which the charging means 500 is inserted, whereby, in the process of the charging means 500 entering the slit 318 of the pouch unit 310, the edge 316 of the pouch unit 310 can be prevented from being pushed into the external container 200.

Hereinafter, a process in which the content charging device according to the present embodiment is operated will be described in detail.

FIGS. 38 and 39 are diagrams illustrating a process in which the content charging device of FIG. 36 is operated.

First, referring to FIG. 38, when the suction means 800 of the content charging device 1 is lowered toward the external container 200, the pressing bracket 851 of the suction means 800 comes into contact with the upper surface of the edge 316 of the pouch unit 310 first.

Next, referring to FIG. 39, when the suction means 800 is further lowered toward the external container 200, a lower end 812 of the suction means body 810 comes into contact with the neck of the external container 200, and the lowering of the suction means 800 is stopped.

In this case, a position of the pressing bracket 851 is maintained in contact with the upper surface of the edge 316. As the suction means body 810 moves, an elastic means 852 disposed between the pressing bracket 851 and an inner surface of the suction means body 810 is compressed. An elastic force caused by the compression of the elastic means 852 presses the pressing bracket 851 toward the upper surface of the edge 316 of the pouch unit 310, thereby bringing the edge 316 of the pouch unit 310 into contact with an end adjacent to an opening of the external container 200.

In a state in which the edge 316 of the pouch unit 310 comes into close contact with the end of the external container 200, the charging means 500 passing through the center of the suction means body 810 is lowered to press and open the slit 318 of the pouch unit 310, and then enters into the charging space 312 of the pouch unit 310.

That is, in a state in which the edge 316 of the pouch unit 310 firmly comes into close contact with the external container 200, the charging means 500 enters into the charging space 312 of the pouch unit 310.

Afterward, the supply of the content $l$ from the charging means 500 is terminated, and the charging means 500 is separated from the charging space 312 of the pouch unit 310. In this case, after the charging means 500 is completely separated from the charging space 312, the pressing of the pouch unit edge pressing unit 850 toward the edge 316 of the pouch unit 310 is released, whereby the edge 316 of the pouch unit 310 can be prevented from deviating from a normal position due to the forward and backward movement of the charging means 500.

Although the exemplary embodiments of the present disclosure have been described above, the present disclosure is not limited to these embodiments. The present disclosure can be carried out in various forms that are variously modified and changed without departing from the claims, the detailed description of the disclosure, and the accompanying drawings, and it goes without saying that these also fall within the scope of the present disclosure.

MODE FOR INVENTION

The modes for carrying out the disclosure have been described along with the above best mode for carrying out the disclosure.

INDUSTRIAL APPLICABILITY

The content charging device and the content charging method using the same according to the present disclosure are provided, and have a repetitive possibility and an industrial applicability, for example, in a container in which a content is stored.

The invention claimed is:

1. A content charging device for a container apparatus that includes: an external container in which a storage space is formed and which includes a container-side opening communicating with the storage space; and a pouch assembly installed on the external container and including a pouch unit which is formed of an elastic material and has a charging space formed to be charged with a liquid, wherein the pouch unit is partly inserted into the storage space through the container-side opening, the content charging device comprising a charging means that is inserted into the charging space of the pouch unit, has flow holes which are formed on one side thereof and through which air or a content is caused to flow, and is slidable toward an end of the pouch unit from a pouch-side opening of the pouch unit wherein fluid channels, which are formed between a part of an inner wall of an opening of the external container and a part of the pouch assembly and provide communication between an internal space of the external container and an outside of the external container, are formed in the container apparatus; and the content charging device further comprises a suction means having a suction means body which surrounds one end of each fluid channel, an inner surface of which is spaced apart from the one end of each fluid channel, and which has a suction space formed between the inner surface and the container apparatus; and a suction hole communicating with the suction space is formed in the suction means body, wherein the suction means further includes a pouch unit edge pressing unit that presses an upper edge of the pouch unit seated on an end of the external container toward the end of the external container, wherein the pouch unit edge pressing unit includes a pressing bracket that is disposed in the suction space of the suction means body so as to be movable in a vertical direction and includes a pressing region that brings the upper edge of the pouch unit into close contact with the end of the external container, and an elastic unit that provides an elastic force to the pressing bracket in a vertical direction, wherein one side of the elastic unit comes into contact with an inner surface of the suction means body, and the other side of the elastic unit comes into contact with the pressing region of the pressing bracket, wherein the pouch unit edge pressing unit further includes a pair of guide brackets which are formed to extend in the same direction as a moving direction of the pressing bracket, into which a part of the pressing bracket is fitted, and which are fixed to an inner surface of the suction means body on one side thereof.

2. The content charging device of claim 1, wherein the suction means further includes an elastic member that is disposed between the suction means body and an outer surface of the external container and comes into close contact with the outer surface of the external container.

3. The content charging device of claim 1, wherein:
a charging means insertion hole into which the charging means is slidably inserted is formed in an upper surface of the suction means body; and
the charging means insertion hole is aligned next to the pouch-side opening of the pouch unit.

4. The content charging device of claim 1, wherein the pouch unit edge pressing unit includes a pressing bracket that is formed to protrude from an inner surface of the suction means body toward the suction space and is formed in an annular shape, and an elastic pressing part that is disposed on a lower side of the pressing bracket, is formed in an annular shape corresponding to the pressing bracket, and has a lower surface coming into contact with an upper surface of the upper edge of the pouch unit.

5. The content charging device of claim 1, wherein:
an elastic unit fixing bracket, on which the one side of the elastic unit is installed, is formed on an inner surface of the suction means body;
an elastic member, which is disposed between the suction means body and an outer surface of the external container and comes into contact with the outer surface of the external container, is provided on a lower side of the suction means body;
the elastic member includes a first region that comes into contact with an end of the suction means body, and a second region that extends toward the center of the suction means on the basis of the first region and has an elastic member-side through-hole which is formed in the center thereof and in which a part of the external container is located;

the pressing bracket further includes a supporting region that is formed outside the pressing region so as to surround the pressing region and is placed on an upper surface of the second region; and an outer diameter of the pressing region is formed in a size corresponding to a diameter of the elastic member-side through-hole, and a step is formed between the pressing region and the supporting region.

6. The content charging device of claim 1, wherein:

the pressing region of the pressing bracket is formed in a circular shape;

a charging means insertion hole, into which the charging means is slidably inserted, is formed in the center of the pressing bracket; and one surface of the pressing region coming into contact with one surface of an edge of the pouch unit is formed in a planar shape.

7. The content charging device of claim 1, wherein:

the pouch assembly of the container apparatus further includes a plurality of guides that come into contact with a pouch unit body of the pouch unit and an inner surface of the external container; and the fluid channels are formed between any one of the guides and another guide.

8. The content charging device of claim 1, wherein:

the charging means is formed long in a vertical direction, and the flow holes are formed in an end of the charging means inserted into the charging space; and the flow holes include a central flow hole disposed in the center of the end of the charging means and lateral flow holes that are disposed at positions beyond the center of the end and are connected to the central flow hole.

9. The content charging device of claim 8, further comprising:

a content supplying means configured to supply the content; and a sucking/exhausting means configured to suck or exhaust air, wherein the charging means is connected to the content supplying means and the sucking/exhausting means, and the content or air selectively flows through the flow holes.

10. The content charging device of claim 1, wherein:

the pouch assembly of the container apparatus further includes a selective sealing unit that is installed in the pouch-side opening and selectively opens/closes the pouch-side opening;

the sealing unit is formed of an elastic material and is openable/closable on the basis of a slit formed in the sealing unit; and the charging means presses and opens the slit of the sealing unit and then is partly inserted into the charging space of the pouch unit.

11. A content charging method using the content charging device of claim 1, the content charging method comprising:

a container preparing step of preparing an external container and a container having a pouch assembly coupled to the external container such that a charging space of the pouch assembly is located in a storage space of the external container;

a pouch stretching step of inserting a part of a charging means into the charging space through a pouch-side opening of the pouch assembly at one side of the external container, then moving the charging means toward the other side of the external container, and extending a pouch unit of the pouch assembly; and a content charging step of charging the charging space of the pouch assembly with a content.

12. The content charging method of claim 11, wherein:

fluid channels, which are formed between a part of an inner wall of an opening of the external container and a part of the pouch assembly and provide communication between an internal space of the external container and an outside of the external container, are formed in the container apparatus; and the content charging device further comprises a suction means having a suction means body which surrounds one end of each fluid channel, an inner surface of which is spaced apart from the one end of each fluid channel, and which has a suction space formed between the inner surface and the container apparatus, wherein a suction hole communicating with the suction space is formed in the suction means body; and the content charging method further comprises an external container pressure reducing step of discharging air of the storage space of the external container, which communicates with the suction hole, the suction space, and the fluid channels, through the suction hole of the suction means to an outside in a state in which the suction means is installed on the container apparatus after the pouch stretching step is performed.

13. The content charging method of claim 12, further comprising a pouch pressure reducing step of reducing a pressure of the charging space of the pouch unit through the flow holes formed at the end of the charging means after the pouch stretching step is performed.

14. The content charging method of claim 13, wherein the pouch pressure reducing step is performed prior to the external container pressure reducing step.

15. The content charging method of claim 11, wherein:

the pouch assembly of the container apparatus further includes a selective sealing unit that is installed in the pouch-side opening and selectively opens/closes the pouch-side opening and has a sealing unit body, the sealing unit body is formed of an elastic material, and is operable/closable on the basis of a slit formed in the sealing unit body; and in the pouch stretching step, the charging means presses and opens the slit of the sealing unit body and is then partly inserted into the charging space of the pouch unit.

16. The content charging method of claim 11, wherein:

the content charging step includes a content spraying step of supplying a content to the charging space through the flow holes in a state in which the pouch unit is extended, and a charging means retreating step of separating the charging means from the charging space of the pouch unit after the charging space of the pouch unit is charged with the content by a preset volume; and in the content spraying step, the charging space of the pouch unit is expanded in a left-right direction intersecting a direction in which the pouch unit is extended in the pouch stretching step.

17. The content charging method of claim 11, further comprising:

a pouch stretching step of supplying air to the charging space through the flow holes in a state in which the pouch unit is extended and expanding the pouch as much as a preset volume; and a content spraying step of supplying the content to the charging space through the flow holes after the pouch unit is extended by a preset volume, wherein the content charging device further includes a content supplying means for supplying the content and a sucking/exhausting means for sucking or exhausting air, the charging means being connected to the content supplying means and the sucking/exhausting means, and the content or air being selectively flows through the flow holes, a flow between the flow holes and the sucking/exhausting means is activated in the pouch stretching step, and a flow between the flow holes and the content supplying means is activated in the content charging step, and in the content spraying step, the charging means is moved in a direction separated from the charging space at a preset speed while the content is supplied to the charging space.

* * * * *